(12) United States Patent
Mori

(10) Patent No.: US 8,480,163 B2
(45) Date of Patent: Jul. 9, 2013

(54) PILLAR STRUCTURE OF VEHICLE AND METHOD FOR MANUFACTURING THE SAME

(75) Inventor: Takeo Mori, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 166 days.

(21) Appl. No.: 13/003,497

(22) PCT Filed: Jul. 2, 2009

(86) PCT No.: PCT/IB2009/006139
§ 371 (c)(1),
(2), (4) Date: Jan. 10, 2011

(87) PCT Pub. No.: WO2010/007481
PCT Pub. Date: Jan. 21, 2010

(65) Prior Publication Data
US 2011/0133515 A1 Jun. 9, 2011

(30) Foreign Application Priority Data
Jul. 14, 2008 (JP) .................................. 2008-183100

(51) Int. Cl.
*B62D 25/04* (2006.01)

(52) U.S. Cl.
USPC ............ 296/193.06; 296/187.12; 296/203.03; 29/897.2

(58) Field of Classification Search
USPC ............. 296/187.12, 193.05, 193.06, 203.03; 29/897.2
See application file for complete search history.

(56) References Cited

U.S. PATENT DOCUMENTS

| 5,671,968 | A | * | 9/1997 | Masuda et al. ............ 296/187.12 |
| 6,474,726 | B1 | * | 11/2002 | Hanakawa et al. ............ 296/191 |
| 7,581,782 | B2 | * | 9/2009 | Tomozawa ............... 296/187.12 |
| 7,815,247 | B2 | * | 10/2010 | Obayashi .................. 296/193.06 |
| 7,976,098 | B2 | * | 7/2011 | Nishimura et al. ....... 296/193.06 |
| 8,128,157 | B2 | * | 3/2012 | Heo et al. .................. 296/193.06 |
| 8,141,938 | B2 | * | 3/2012 | Miyashita ................. 296/193.06 |
| 8,246,108 | B2 | * | 8/2012 | Itakura .................... 296/193.06 |

(Continued)

FOREIGN PATENT DOCUMENTS

| EP | 1 457 576 | 9/2004 |
| JP | 2 100980 | 8/1990 |

(Continued)

OTHER PUBLICATIONS

Office Action issued Mar. 5, 2012, in Japanese Patent Application No. 2008-183100 with English translation.

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

In a center pillar structure, the strength of a center pillar is locally low at a weak portion and at a weak portion. Thus, when a vehicle is hit on the side, the center pillar bends at the weak portion and at the weak portion, and the other vehicle advances substantially horizontally. This can reduce the bending moment generated in the center pillar due to advancement of the other vehicle, so it is possible to control deformation of the center pillar in the event of a side collision while ensuring the strength of the center pillar.

24 Claims, 28 Drawing Sheets

U.S. PATENT DOCUMENTS

| | | | |
|---|---|---|---|
| 8,262,152 B2 * | 9/2012 | Okumura et al. | 296/193.06 |
| 8,292,354 B2 * | 10/2012 | Bodin et al. | 296/193.06 |
| 2004/0113461 A1 | 6/2004 | Shimizu et al. | |
| 2005/0023862 A1 | 2/2005 | Saeki | |
| 2005/0046233 A1 | 3/2005 | Saeki | |
| 2005/0151363 A1 | 7/2005 | Saeki | |
| 2006/0208537 A1 * | 9/2006 | Dingman et al. | 296/193.05 |
| 2010/0194146 A1 * | 8/2010 | Nishimura et al. | 296/193.06 |

FOREIGN PATENT DOCUMENTS

| | | |
|---|---|---|
| JP | 7-61368 | 3/1995 |
| JP | 8 310442 | 11/1996 |
| JP | 9 175428 | 7/1997 |
| JP | 10 17933 | 1/1998 |
| JP | 2002-347655 | 12/2002 |
| JP | 2003-160062 | 6/2003 |
| JP | 2003 205868 | 7/2003 |
| JP | 2003-239018 | 8/2003 |
| JP | 2003 312536 | 11/2003 |
| JP | 2005-199749 | 7/2005 |
| JP | 2006 321491 | 11/2006 |
| WO | 2009 064236 | 5/2009 |

OTHER PUBLICATIONS

International Search Report issued Oct. 22, 2009 in PCT/IB09/06139 filed Jul. 2, 2009.

* cited by examiner

F I G . 13
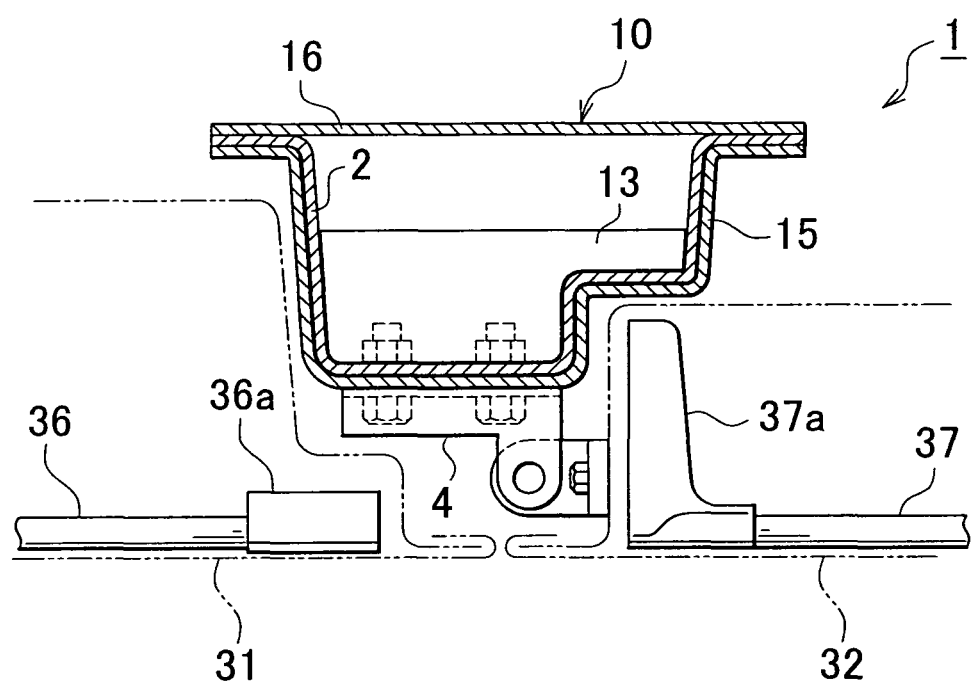

PILLAR STRUCTURE OF VEHICLE AND METHOD FOR MANUFACTURING THE SAME

BACKGROUND OF THE INVENTION

1. Field of the Invention

The invention relates to a pillar structure applied to a vehicle, such as an automobile, and a method for manufacturing the pillar structure.

2. Description of the Related Art Japanese Patent Application Publication No. 10-17933 (JP-A-10-17933) describes a pillar structure for preventing a local deformation of a pillar when a vehicle is hit on the side. In this pillar structure, a reinforcement member of the pillar is quenched to have a strength distribution similar to an impact load distribution.

However, in the above described pillar structure, it is extremely difficult to control deformation of a pillar in the event of a side collision while ensuring the strength of the pillar.

SUMMARY OF THE INVENTION

The invention provides a pillar structure of a vehicle, which is able to control deformation of a pillar in the event of a side collision while ensuring the strength of the pillar, and a method for manufacturing the pillar structure.

A first aspect of the invention provides a pillar structure of a vehicle. The pillar structure of a vehicle includes: a pillar that includes a first weak portion and a second weak portion, wherein the second weak portion is located above the first weak portion.

With the above aspect, when the vehicle is hit on the side, the pillar bends at least at two portions, that is, the first weak portion and the second weak portion, so it is possible to reduce the bending moment generated in the pillar. Thus, with the pillar structure, it is possible to control deformation of the pillar in the event of a side collision while ensuring the strength of the pillar.

In the above aspect, the pillar may have a protrusion, that protrudes outward from the pillar in a vehicle width direction, between the first weak portion and the second weak portion. With the above aspect, when the vehicle is hit on the side, it is possible to concentrate external force on the portion between the first weak portion and the second weak portion, and, as a result, it is possible to deform that portion desirably.

In the above aspect, the strength of the first weak portion may be lower than the strength of the second weak portion. With the above aspect, when the vehicle is hit on the side, it is possible to cause a portion between the first weak portion and the second weak portion to deform to be substantially parallel to a vertical direction.

In the above aspect, the first weak portion may be located below an acting portion at which external force is assumed to act on the pillar from an outer side in a vehicle width direction, and the second weak portion may be located above the acting portion. With the above aspect, when the vehicle is hit on the side, it is possible to desirably deform a portion between the first weak portion and the second weak portion.

In the above aspect, the pillar may include an outer shell and a reinforcement member arranged in the outer shell, and the first weak portion and the second weak portion may be respectively implemented by weakened portions in the reinforcement member. With the above aspect, it is possible to easily and reliably provide the pillar with the first weak portion and the second weak portion.

In the above aspect, the weakened portions in the reinforcement member may be implemented by beads formed in the reinforcement member.

In the above aspect, a difference in strength between the first weak portion and the second weak portion may be implemented by at least any one of the size of the beads, the number of the beads, and the thickness of the reinforcement member in which the beads are formed.

In the above aspect, each of the weakened portions in the reinforcement member may be implemented by at least one of a bead or a harness fitting hole, which is formed in the reinforcement member.

In the above aspect, the reinforcement member may have portions to which a first hinge and a second hinge of a door are attached, the first hinge may be attached between the first weak portion and the second weak portion, and the second hinge may be attached above the second weak portion.

In the above aspect, the ratio of a distance between the second weak portion and the first hinge to a distance between the first weak portion and the first hinge may range from 1:1 to 2:1.

In the above aspect, at least one of the first hinge and the second hinge may project in a vehicle width direction of the vehicle.

In the above aspect, an end portion of a door beam may be arranged in correspondence with at least one of the first weak portion and the second weak portion. With the above aspect, when the vehicle is hit on the side, it is possible to cause the pillar to reliably bend at the first weak portion and at the second weak portion.

In the above aspect, at least one of the first weak portion and the second weak portion may include a load input member that facilitate a load to be input to the at least one of the first weak portion and the second weak portion when external force acts on the vehicle from an outer side in a vehicle width direction.

In the above aspect, a shock-absorbing member may be attached between the first weak portion and the second weak portion.

In the above aspect, the pillar may be configured so that, when external force acts on a portion between the first weak portion and the second weak portion from an outer side in a vehicle width direction, a displacement of the portion between the first weak portion and the second weak portion is maximal. With the above aspect, for example, it is possible to prevent a situation that the pillar bends only at a portion corresponding to the first weak portion and then that portion protrudes into a cabin of the vehicle.

In the above aspect, the pillar may include an outer shell and a reinforcement member arranged in the outer shell, and the reinforcement member may have non-quenched portions formed at an upper portion and a lower portion with respect to a portion to which a lower hinge of a door is attached, and quenched portions formed at portions other than the upper portion and the lower portion, wherein the first weak portion and the second weak portion may be implemented by the non-quenched portions. With the above aspect, the reinforcement member has the non-quenched portions formed at the upper portion and the lower portion with respect to the portion to which the lower hinge is attached, so it is possible to easily and reliably provide the pillar with the first weak portion and the second weak portion. Then, when the vehicle is hit on the side, the reinforcement member bends at the upper and lower portions with respect to the portion to which the lower hinge is attached, so it is possible to reduce the bending moment generated in the reinforcement member.

In the above aspect, the pillar may include an outer shell and a reinforcement member arranged in the outer shell, and the first weak portion and the second weak portion may be implemented by non-quenched portions.

In the above aspect, the non-quenched portions may be formed in the reinforcement member to project toward the outer shell.

In the above aspect, the reinforcement member may be manufactured in such a manner that, when the reinforcement member is quenched, flow of cooling water to portions of the heated reinforcement member, corresponding to the quenched portions, is increased as compared with flow of cooling water to portions of the heated reinforcement member, corresponding to the non-quenched portions. With the above aspect, the quenching densities of the portions of the reinforcement member, corresponding to the non-quenched portions, are lower than the quenching densities of the portions of the reinforcement member, corresponding to the quenched portions, so it is possible to reliably form the non-quenched portions at the upper portion and the lower portion of the reinforcement member with respect to the portion to which the lower hinge of the door is attached.

In the above aspect, the reinforcement member may be manufactured in such a manner that the portions corresponding to the non-quenched portions are formed to project, gaps between a hot stamping die and the portions corresponding to the non-quenched portions are narrower than gaps between the die and the portions corresponding to the quenched portions and then flow of the cooling water to the portions corresponding to the quenched portions is increased as compared with flow of the cooling water to the portions corresponding to the non-quenched portions. Alternatively, in the above aspect, the reinforcement member may be manufactured in such a manner that cooling water supply holes are formed in a hot stamping die in correspondence with the quenched portions, cooling water drain holes are formed in the die in correspondence with boundaries between the quenched portions and the non-quenched portions and then flow of the cooling water to the portions corresponding to the quenched portions is increased as compared with flow of the cooling water to the portions corresponding to the non-quenched portions. With the above two aspects, flow of cooling water to the portions of the reinforcement member, corresponding to the non-quenched portions, is suppressed, so it is possible to easily and reliably form the non-quenched portions at the upper portion and the lower portion with respect to the portion to which the lower hinge of the door is attached.

In the above aspect, the ground height of the first weak portion and the ground height of the second weak portion may be determined on the basis of a height at which external force is assumed to act on the vehicle from an outer side in a vehicle width direction.

In the above aspect, the ground height of the first weak portion and the ground height of the second weak portion may be determined on the basis of a bumper height of a typical vehicle.

A second aspect of the invention provides a method for manufacturing a pillar structure that includes a pillar having an outer shell and a reinforcement member arranged in the outer shell. The method includes: when the reinforcement member is quenched, increasing flow of cooling water to portions of the heated reinforcement member, other than an upper portion and a lower portion with respect to a portion, to which a lower hinge of a door is attached, in the heated reinforcement member, as compared with the upper portion and the lower portion; and providing the pillar with a first weak portion and a second weak portion, which is located above the first weak portion, in such a manner that the upper portion and the lower portion are formed as non-quenched portions and the portions other than the upper portion and the lower portion are formed as quenched portions.

With the above aspect, it is possible to easily manufacture the above described pillar structure of a vehicle according to the first aspect of the invention.

With the above first and second aspects, it is possible to control deformation of the pillar in the event of a side collision while ensuring the strength of the pillar.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 13 is a cross-sectional view of the center pillar structure that has the door beams having the end portions arranged in correspondence with the weak portions;

DETAILED DESCRIPTION OF EMBODIMENTS

Figure 1:
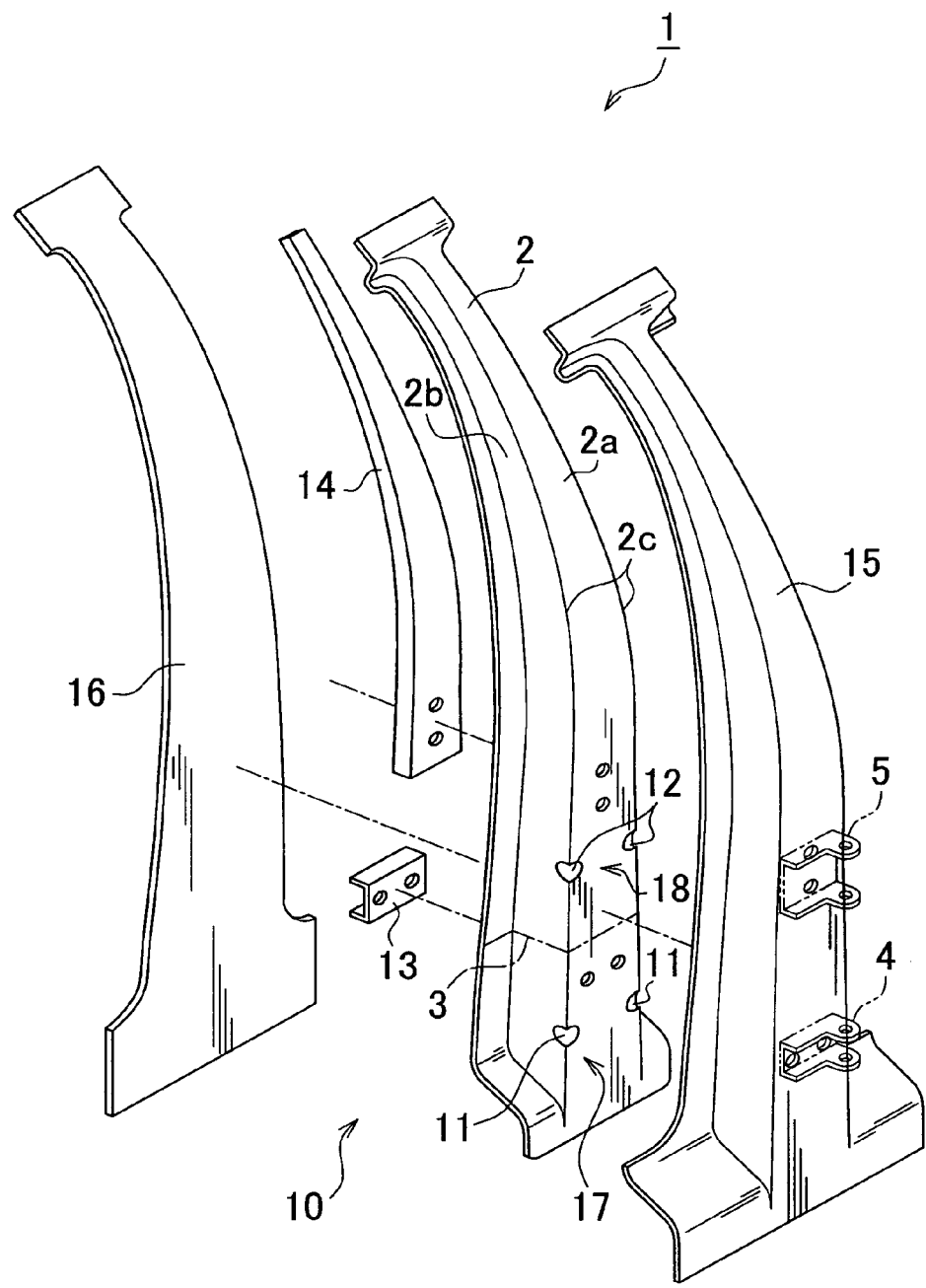
FIG. 1 is an exploded perspective view of a center pillar structure, which is a first embodiment of the pillar structure of a vehicle according to the invention.

Hereinafter, embodiments of the invention will be described in detail with reference to the accompanying drawings. Note that like reference numerals denote like or corresponding components in the drawings, and the overlap description is omitted.

Figure 2:
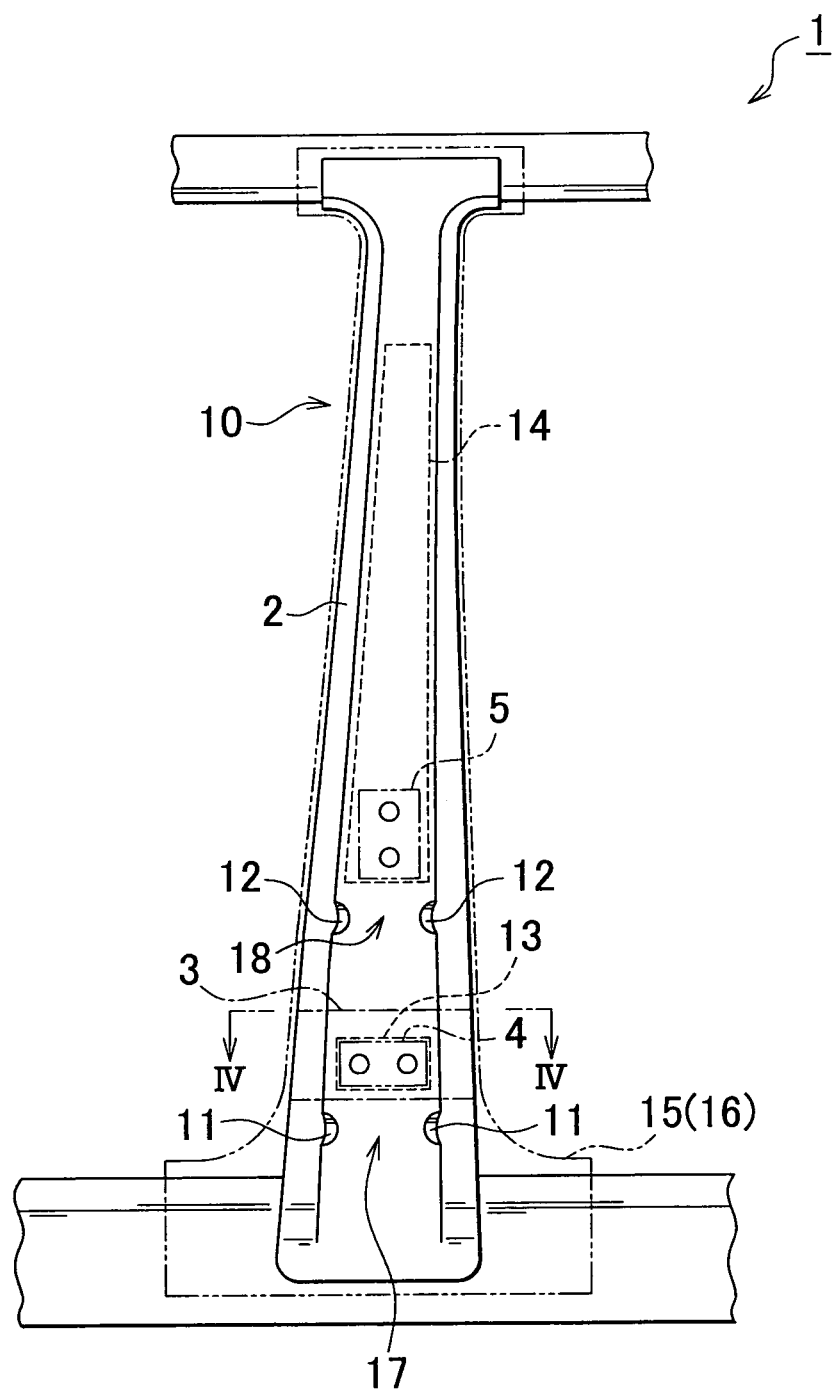
FIG. 2 is a side view of the center pillar structure shown in FIG. 1.

FIG. 1 is an exploded perspective view of a center pillar structure, which is a first embodiment of the pillar structure of a vehicle according to the invention. FIG. 2 is a side view of the center pillar structure shown in FIG. 1. As shown in FIG. 1 and FIG. 2, the center pillar structure 1 of a vehicle, such as an automobile, includes a center pillar 10. The center pillar 10 includes an outer panel 15, an inner panel 16, an outer reinforcement 2 and hinge reinforcements 13 and 14. The outer panel 15 and the inner panel 16 extend from a rocker to a roof side rail. The outer reinforcement 2 and the hinge reinforcements 13 and 14 are arranged in an internal space defined by the outer panel 15 and the inner panel 16.

The outer panel 15 may be regarded as an outer shell member according to the aspect of the invention. The inner panel 16 may be regarded as an outer shell member according to the aspect of the invention. The outer reinforcement 2 may be regarded as a reinforcement member according to the aspect of the invention.

The outer reinforcement 2 is formed so that high-tensile steel plates are jointed at a laser welding seam 3 as a boundary. The lower end portion of the outer reinforcement 2 is connected to the rocker, and the upper end portion of the outer reinforcement 2 is connected to the roof side rail. Note that the strength of the lower high-tensile steel plate with respect to the laser welding seam 3 is lower than the strength of the upper high-tensile steel plate with respect to the laser welding seam 3 in such a manner that, for example, the thickness of the lower high-tensile steel plate is made thinner. That is, in the outer reinforcement 2, the portion on the lower side of the laser welding seam 3 is weaker than the portion on the upper side of the laser welding seam 3.

The outer reinforcement 2 has beads 11 and 12 such that a pair of outer edge lines 2c formed by an outer wall 2a and a pair of side walls 2b are cut out. The beads 11 are located below the laser welding seam 3, and the beads 12 are located above the laser welding seam 3. Thus, the center pillar 10 has a weak portion 17 and a weak portion 18. The weak portion 17 is implemented by the beads 11. The weak portion 18 is implemented by the beads 12.

The beads 11 and 12 may be regarded as weakened portions in the reinforcement member according to the aspect of the invention. The weak portion 17 may be regarded as a first weak portion according to the aspect of the invention. The weak portion 18 may be regarded as a second weak portion according to the aspect of the invention.

In the outer reinforcement 2, a lower hinge 4 for a door is attached to a portion between the beads 11 and the beads 12, and an upper hinge 5 for the door is attached to a portion on the upper side of the beads 12. That is, the center pillar structure 1 includes the lower hinge 4, which is a protrusion between the weak portion 17 and the weak portion 18, and the protrusion protrudes outward from the center pillar 10 in the vehicle width direction.

The hinge reinforcement 13 is arranged on the inner side of the outer reinforcement 2 in correspondence with a portion of the outer reinforcement 2, to which the lower hinge 4 is attached. The hinge reinforcement 14 is arranged on the inner side of the outer reinforcement 2 so as to extend from a portion of the outer reinforcement 2, to which the upper hinge 5 is attached, to an upper end portion of the outer reinforcement 2. Note that, here, the laser welding seam 3 is located between the portion, to which the lower hinge 4 is attached, and the beads 12; however, the laser welding seam 3 may be located between the portion, to which the lower hinge 4 is attached, and the beads 11.

Figure 3:
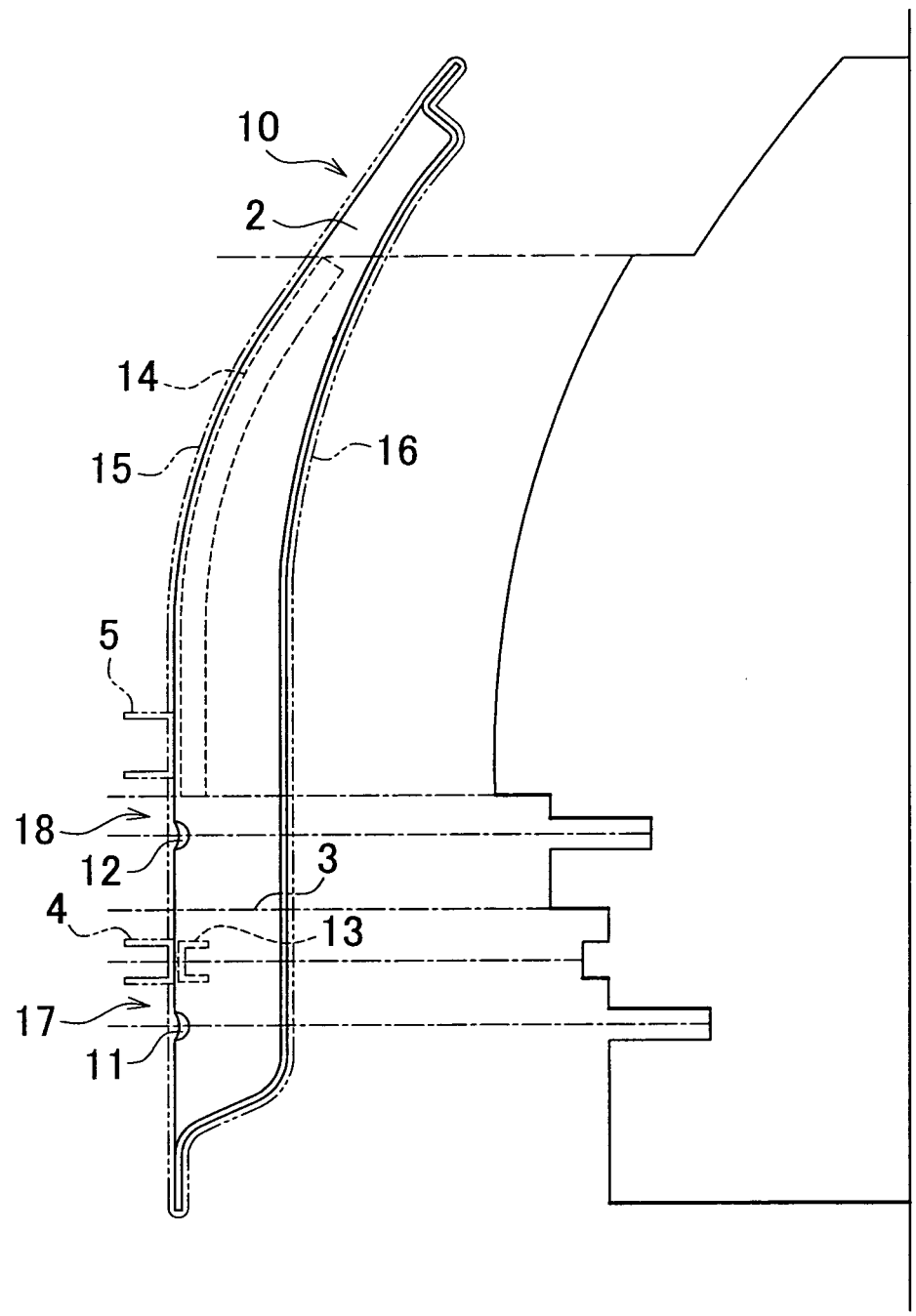
FIG. 3 is a view that shows a strength distribution of a center pillar of the center pillar structure shown in FIG. 1.

The graph with projections and depressions at the right side in FIG. 3 shows a strength distribution of the center pillar structure 1. In the above configured center pillar structure 1, as shown in FIG. 3, the strength of the center pillar 10 is locally low at the weak portion 17 and at the weak portion 18. Therefore, when the vehicle is hit on the side, the center pillar 10 bends at the weak portion 17 and at the weak portion 18, and therefore the vehicle colliding advances substantially horizontally. This can reduce the bending moment generated in the center pillar 10 due to the advancement of the colliding vehicle, so it is possible to control deformation of the center pillar 10 in the event of a side collision while ensuring the strength of the center pillar 10.

In addition, as shown in FIG. 3, by setting the lower end portion of the hinge reinforcement 14 near the upper beads 12, the strength of the center pillar 10 is varied by a large amount between the upper side and the lower side with respect to the lower end portion of the hinge reinforcement 14. This can remarkably localize a decrease in strength of the upper weak portion 18.

In addition, the weak portion 17 and the weak portion 18 are implemented by the beads 11 and beads 12 of the outer reinforcement 2, so it is possible to easily and reliably provide the center pillar 10 with the weak portion 17 and the weak portion 18.

Note that in the strength distribution shown in FIG. 3, the strength is minimal at the weak portion 17 and at the weak portion 18; however, the strength does not need to be minimal as long as the strength is locally low at the weak portion 17 and at the weak portion 18.

Next, a location of the lower hinge 4, which is a protrusion that protrudes outward from the center pillar 10 in the vehicle width direction between the weak portion 17 and the weak portion 18, will be described.

As shown in Table 1, the lower hinge 4 or an assumed load input region (acting portion at which external force is assumed to act on the center pillar 10 from the outer side in the vehicle width direction) may be located at a ground height of 400 mm to 500 mm. This is based on the bumper height of a typical vehicle. Alternatively, the lower hinge 4 or the assumed load input region may be located at a height that at least partially or entirely falls within the bumper height of the host vehicle.

TABLE 1

| | GROUND HEIGHT (mm) | | |
|---|---|---|---|
| | MOST DESIRABLE RANGE | MINIMUM | MAXIMUM |
| UPPER WEAK PORTION 18 | 500 TO 550 | 500 | 600 |
| LOWER HINGE 4 OR ASSUMED LOAD INPUT REGION | 400 TO 500 | 300 | 600 |
| LOWER WEAK PORTION 17 | 350 TO 400 | 300 | 400 |

In addition, the assumed load input region is a region in which a load acts from an object that is assumed to collide at the time of design, and may be, for example, a region corresponding to the bumper height. The weak portion 17 and the weak portion 18 may be located in the middle of the assumed load input region or so as to place the entire assumed load input region in between from above and below.

The ratio of the "distance between the upper weak portion 18 and the lower hinge 4" to the "distance between the lower weak portion 17 and the lower hinge 4" may be a range from 1:1 to 2:1. When the ratio is 1:1, it is possible to reliably deform the portion between the weak portion 17 and the weak portion 18 so as to be substantially parallel to the vertical direction when the vehicle is hit on the side. On the other hand, when the ratio is 2:1, the bending point approaches the middle portion of the center pillar 10 without significantly losing the parallelism between the vertical direction and the portion between the weak portion 17 and the weak portion 18. Thus, it is possible to further reduce the bending moment generated in the center pillar 10.

Next, the operations and advantages of the lower hinge 4, which is a protrusion that protrudes outward from the center pillar 10 in the vehicle width direction between the weak portion 17 and the weak portion 18, will be described.

Figure 4:
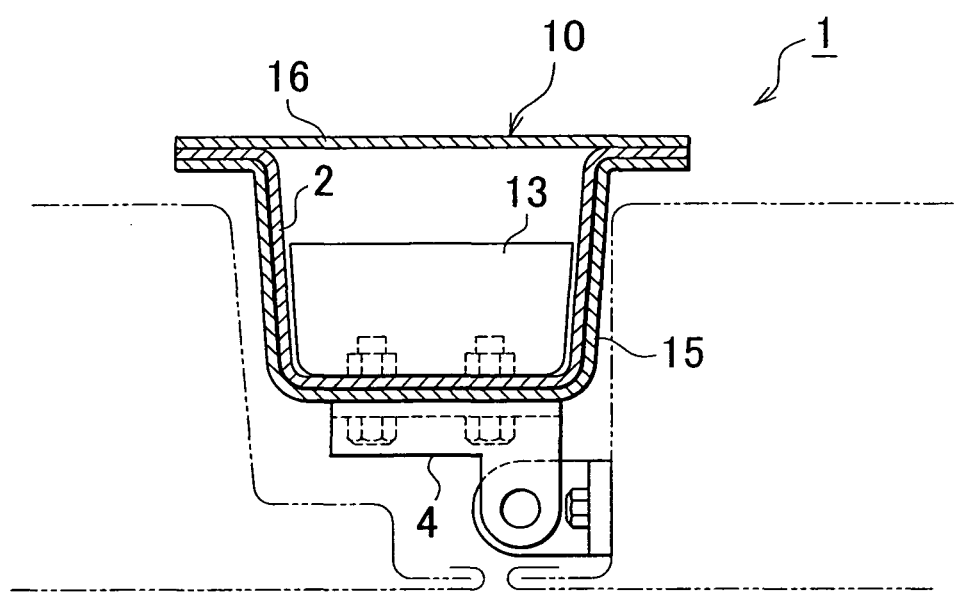
FIG. 4 is a cross-sectional view that is taken along the line IV-IV in FIG. 2.
Figure 5:
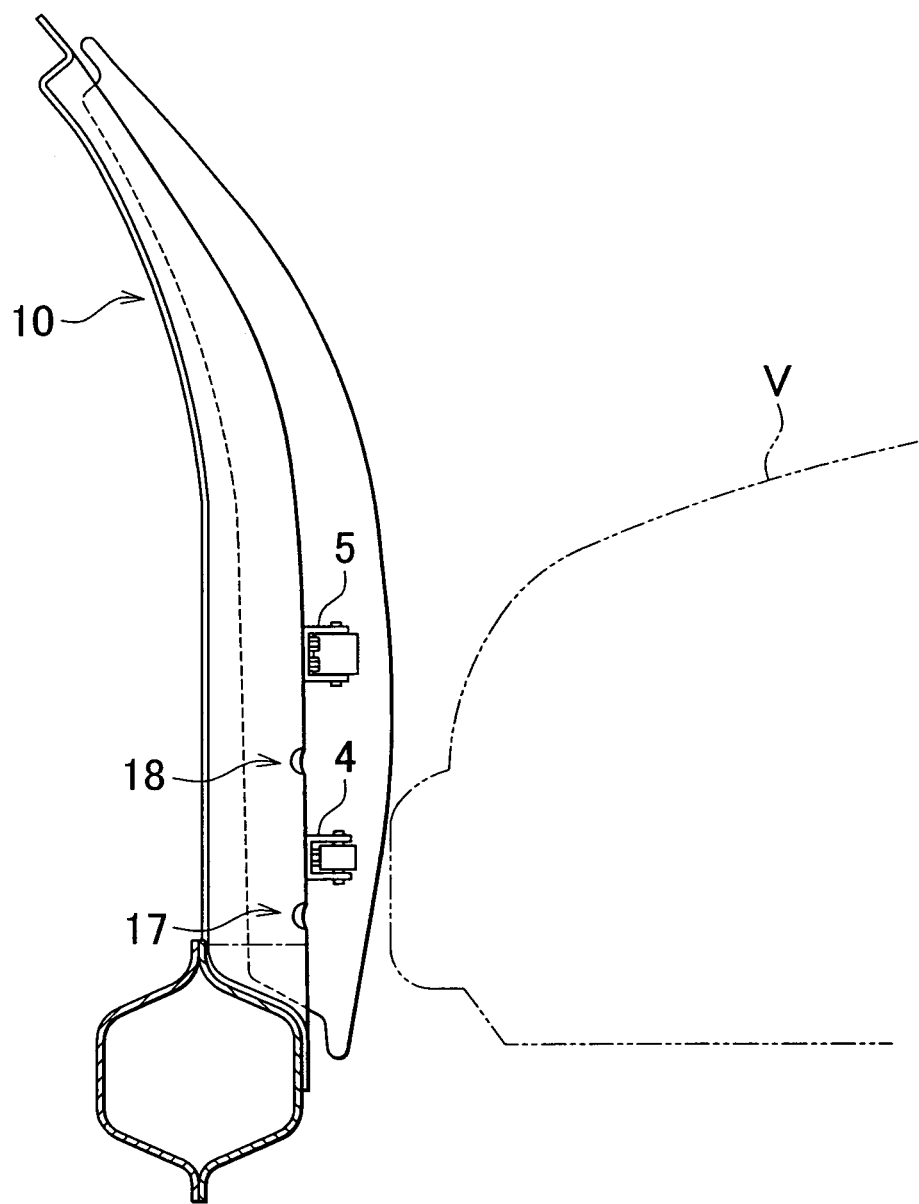
FIG. 5 is a front view of the center pillar structure shown in FIG. 1.

FIG. 4 is a cross-sectional view of the center pillar structure 1, taken along the line IV-IV in FIG. 2. FIG. 5 is a front view of the center pillar structure 1 shown in FIG. 1. As shown in FIG. 4 and FIG. 5, the lower hinge 4 protrudes outward from the center pillar 10 in the vehicle width direction between the weak portion 17 and the weak portion 18. Therefore, it is possible to easily concentrate a load on the portion between the weak portion 17 and the weak portion 18 in the initial stage of a collision with an object, such as the other vehicle V, and, as a result, it is possible to deform that portion desirably.

Note that, in the case of a pillar, such as a center pillar of a slide door or a center pillar of a two-door vehicle, that is not equipped with a door hinge, by providing a protrusion, instead of the lower hinge 4, that protrudes outward in the vehicle width direction, it is also possible to easily concentrate a load on the portion between the weak portion 17 and the weak portion 18.

In addition, the hinge reinforcement 13 is arranged on the inner side of the outer reinforcement 2 in correspondence with a portion of the outer reinforcement 2, to which the lower hinge 4 is attached. By doing so, it is possible to relatively increase the strength of the portion between the weak portion 17 and the weak portion 18 as compared with the strength of the weak portion 17 or the strength of the weak portion 18.

Next, the relative relationship between the strength of the weak portion 17 and the strength of the weak portion 18 will be described.

In the outer reinforcement 2, the thickness of the high-tensile steel plate is, for example, varied between above and below the laser welding seam 3 to increase the weakness of the portion on the lower side of the laser welding seam 3 as compared with the portion on the upper side of the laser welding seam 3. In addition, the outer reinforcement 2 has the beads 11 and the beads 12. The beads 11 are located below the laser welding seam 3. The beads 12 are located above the laser welding seam 3. Thus, the strength of the weak portion 17 formed below the laser welding seam 3 is lower than the weak portion 18 formed above the laser welding seam 3.

Figure 6A:
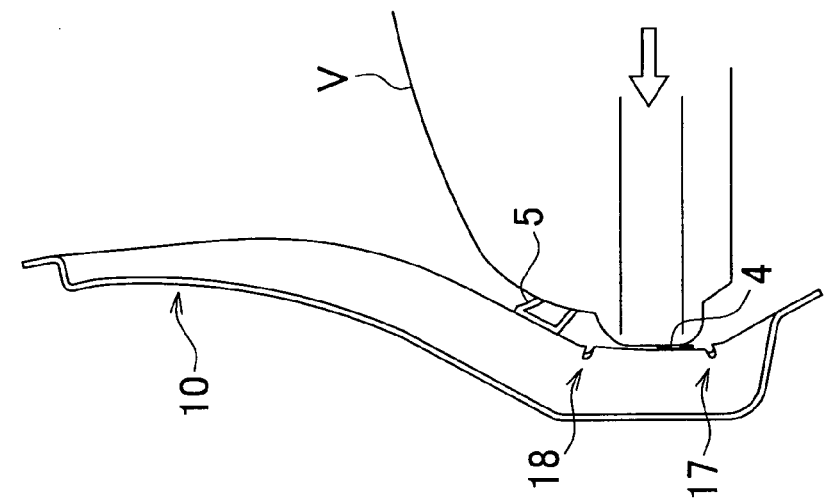
FIG. 6A and FIG. 6B are views that show a state of deformation of the center pillar of the center pillar structure shown in FIG. 1.
Figure 6B:
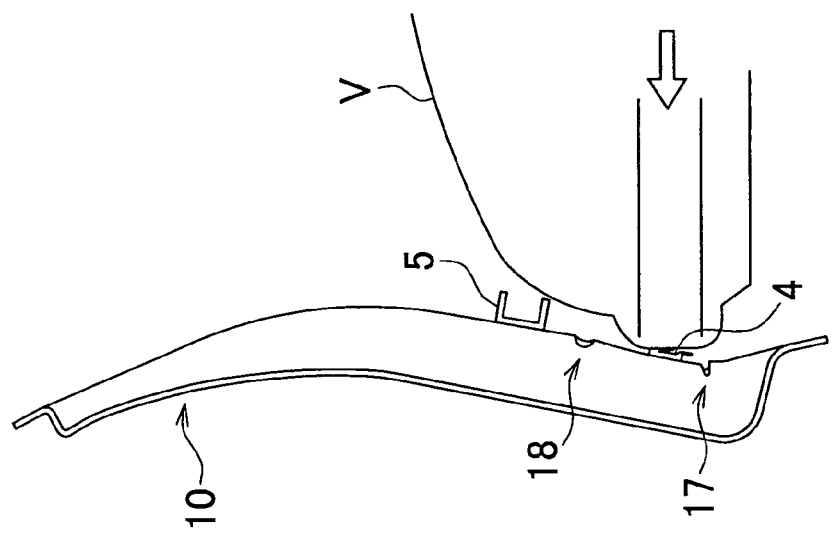

The strength of the lower weak portion 17 may be decreased as compared with the strength of the upper weak portion 18. When the strength of the lower weak portion 17 is lower than the strength of the upper weak portion 18, the center pillar 10 bends at the lower weak portion 17 in the initial stage in which the other vehicle V (that is the vehicle colliding) collides with the side of the host vehicle as shown in FIG. 6A, and, thereafter, the center pillar 10 bends at the upper weak portion 18 as shown in FIG. 6B. Therefore, the other vehicle V advances substantially horizontally, and the portion between the weak portion 17 and the weak portion 18 deforms to be substantially parallel to the vertical direction. Thus, it is possible to reduce the bending moment generated in the center pillar 10 due to advancement of the other vehicle V.

Note that the strength of the upper weak portion 18 may be decreased as compared with the strength of the lower weak portion 17, or the strength of the upper weak portion 18 may be equivalent to the strength of the lower weak portion 17.

Next, the load input member 19 that is arranged in correspondence with the weak portion 17 will be described.

Figure 7:
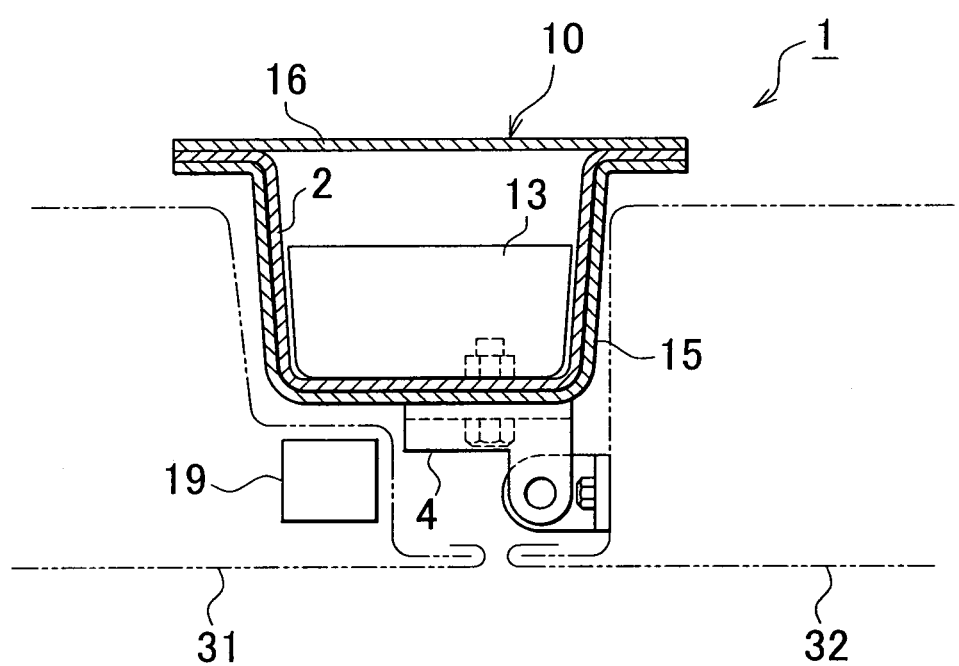
FIG. 7 is a cross-sectional view of a center pillar structure that has a load input member.
Figure 8:
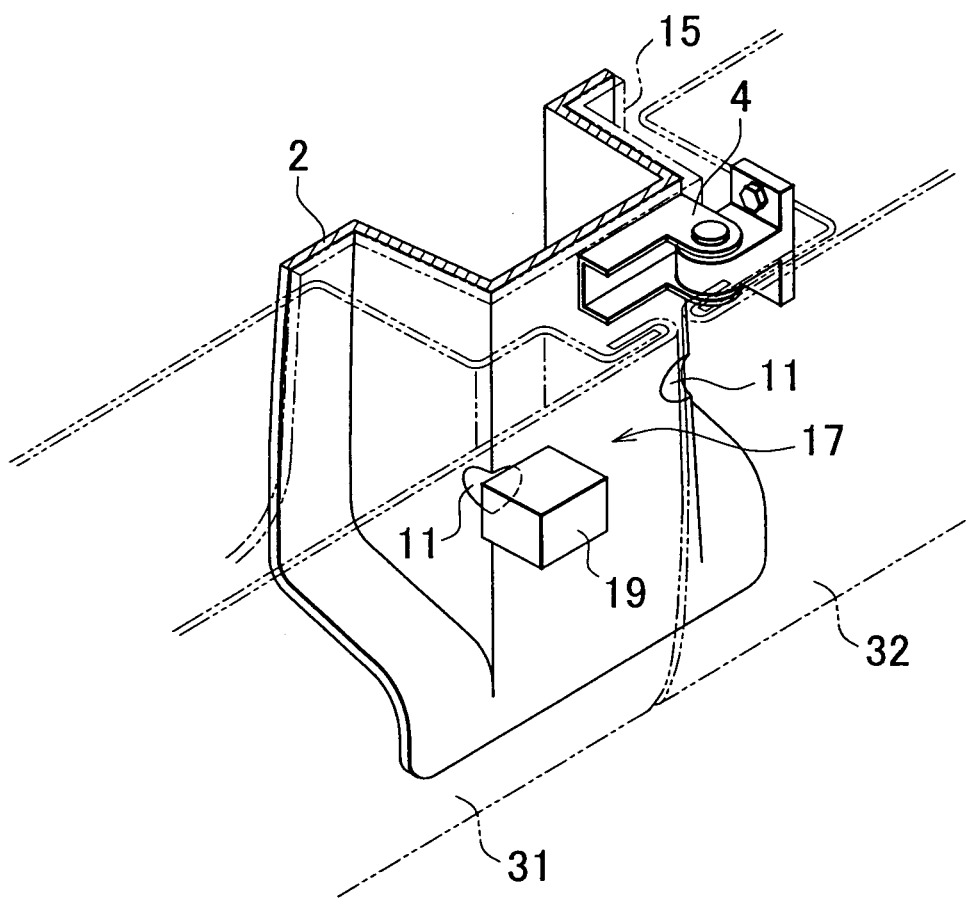
FIG. 8 is a perspective view of the center pillar structure that has the load input member.
Figure 9:
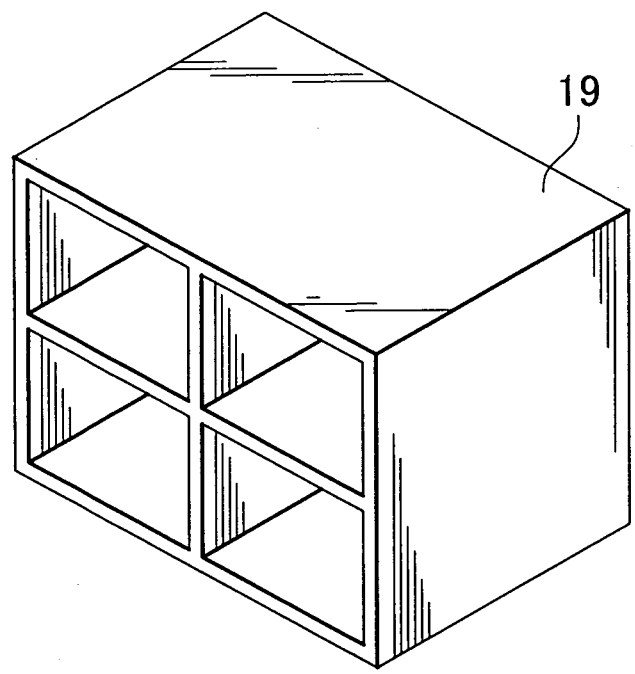
FIG. 9 is a perspective view of the load input member.

FIG. 7 is a cross-sectional view of a center pillar structure that has the load input member 19. FIG. 8 is a perspective view of the center pillar structure that has the load input member 19. FIG. 9 is a perspective view of the load input member 19. As shown in FIG. 7 and FIG. 8, the load input member 19 is arranged in a front door 31 so as to face the lower weak portion 17 in the vehicle width direction. As shown in FIG. 9, the load input member 19 is, for example, made of resin and has a block shape. The load input member 19 is hollowed for reduction in weight. The strength of the load input member 19 is higher than the strength of the outer reinforcement 2, and is lower than the bonding strength between the rocker and the outer reinforcement.

With the above configuration, in the initial stage in which the other vehicle V collides with the side, the load concentrates on the lower hinge 4 and then the load input member 19 facilitates a local load to be input to the weak portion 17. Thus, for example, even when the strength of the lower weak portion 17 is equivalent to the strength of the upper weak portion 18, it is possible to cause the center pillar 10 to initially bend at the lower weak portion 17 and subsequently bend at the upper weak portion 18. By doing so, the other vehicle V advances substantially horizontally, and the portion between the weak portion 17 and the weak portion 18 deforms to be substantially parallel to the vertical direction. Hence, it is possible to reduce the bending moment generated in the center pillar 10 due to advancement of the other vehicle V.

Note that the load input member 19 may be arranged in correspondence with at least one of the weak portion 17 and the weak portion 18. When the load input member 19 is arranged in correspondence with each of the weak portion 17 and the weak portion 18, the strength of the load input member 19 arranged in correspondence with the upper weak portion 18 and the strength of the load input member 19 arranged in correspondence with the lower weak portion 7 are varied to thereby making it possible to control local loads input respectively to the weak portion 17 and the weak portion 18. In addition, the load input member 19 may be arranged in a rear door 32.

Next, a weak portion 18 implemented by a harness fitting hole 35 will be described.

Figure 10:
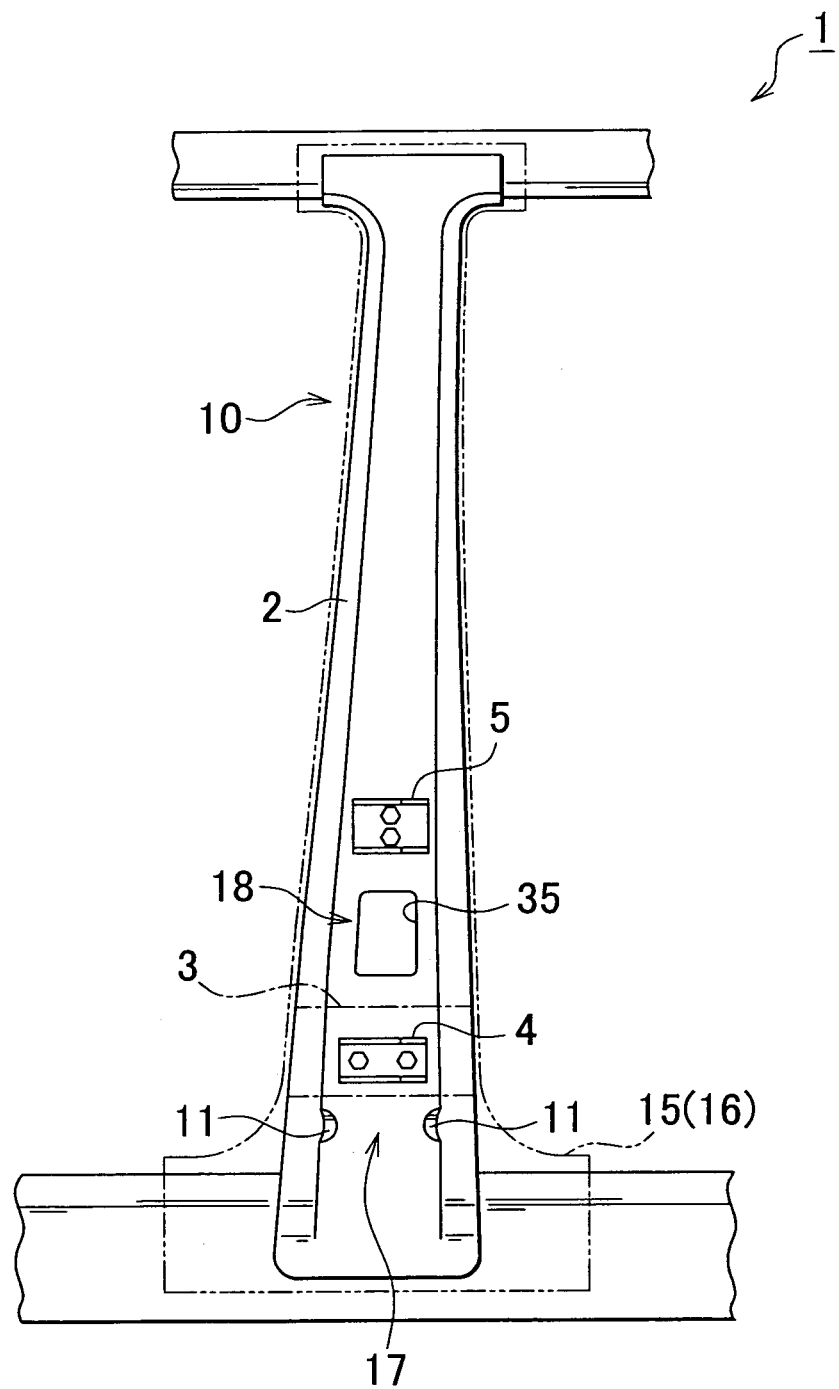
FIG. 10 is a side view of a center pillar structure that has a weak portion implemented by a harness fitting hole.
Figure 11:
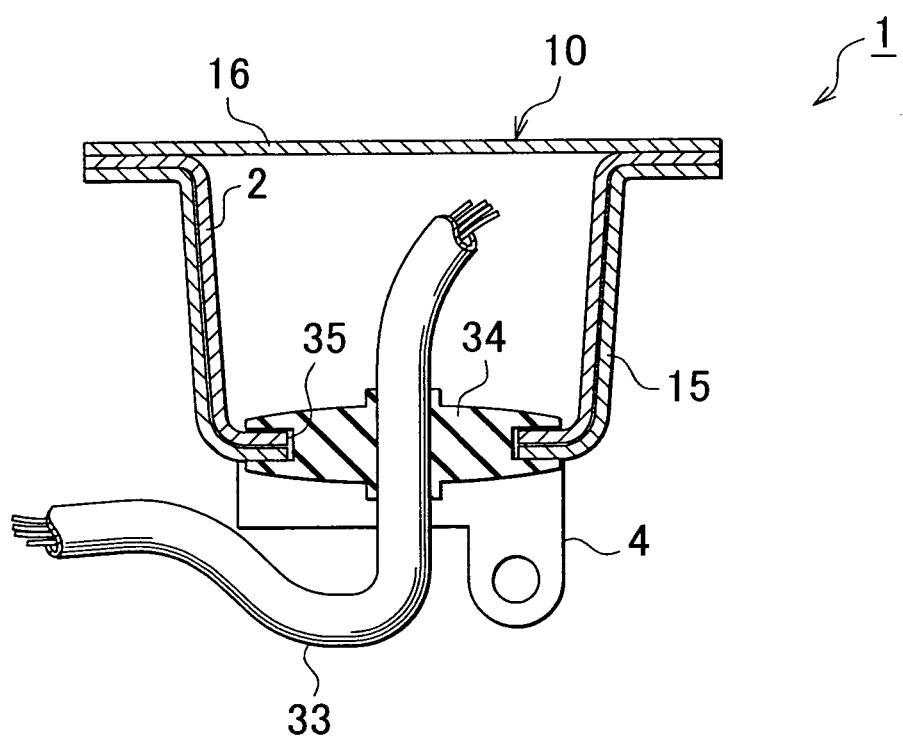
FIG. 11 is a cross-sectional view of the center pillar structure that has the weak portion implemented by the harness fitting hole.

FIG. 10 is a side view of a center pillar structure that has the weak portion implemented by the harness fitting hole 35. FIG. 11 is a cross-sectional view of the center pillar structure that has the weak portion implemented by the harness fitting hole. As shown in FIG. 10 and FIG. 11, the harness fitting hole 35 is formed in the center pillar 10 between the portion to which the lower hinge 4 is attached and the portion to which the upper hinge 5 is, attached. A harness 34 is attached to the harness fitting hole 35 and holds a wire 33 associated with a power window, a door lock, and the like. In this way, the upper weak portion 18 may be implemented by the harness fitting hole 35 instead of the beads 12.

Note that it is also applicable that the harness fitting hole 35 is formed on the lower side with respect to the portion of the center pillar 10, to which the lower hinge 4 is attached, and the lower weak portion 17 is implemented by the harness fitting hole 35 instead of the beads 11.

Next, door beams that have end portions arranged in correspondence with the weak portions 17 and 18 will be described.

Figure 12:
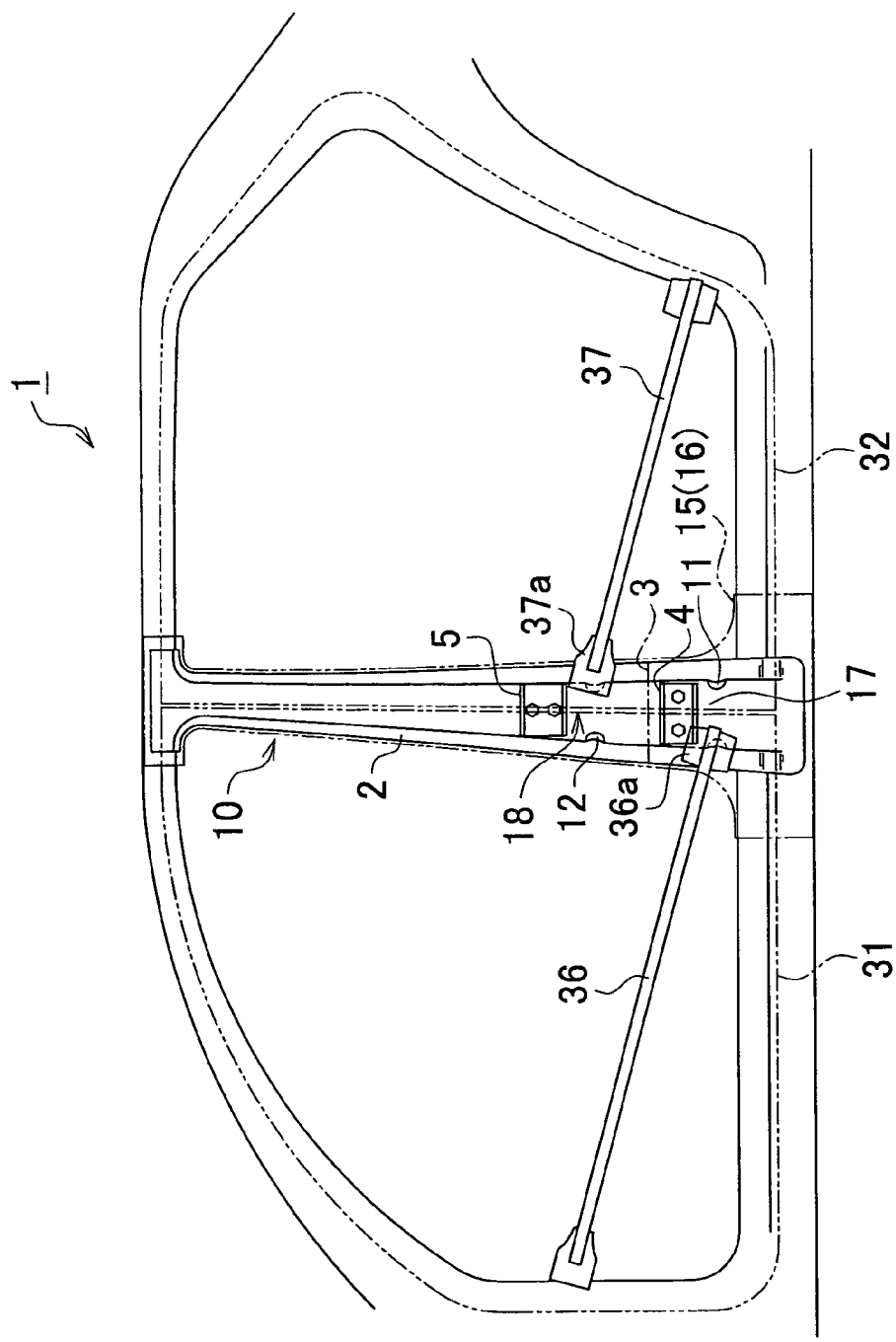
FIG. 12 is a side view of a center pillar structure that has door beams having end portions arranged in correspondence with the weak portions.

FIG. 12 is a side view of a center pillar structure that has door beams having end portions arranged in correspondence with the weak portions. FIG. 13 is a cross-sectional view of the center pillar structure that has the door beams having the end portions arranged in correspondence with the weak portions. As shown in FIG. 12 and FIG. 13, a rear end portion 36a of a front door beam 36 is arranged in the front door 31 so as to face the lower weak portion 17 in the vehicle width direction, and a front end portion 37a of a rear door beam 37 is arranged in the rear door 32 so as to face the upper weak portion 18 in the vehicle width direction. The door beams 36 and 37 are reinforcement members for absorbing energy when the vehicle is hit on the side.

With the above configuration, in the initial stage in which the other vehicle V collides with the side, the load concentrates on the lower hinge 4 and then the rear end portion 36a of the front door beam 36 facilitates a local load to be input to the lower weak portion 17, while the front end portion 37a of the rear door beam 37 facilitates a local load to be input to the upper weak portion 18. Thus, for example, even when the other vehicle V collides with the middle of the front door 31 or the middle of the rear door 37 with an offset frontward or rearward from the center pillar 10, it is possible to reliably bend the center pillar 10 at the weak portion 17 and at the weak portion 18.

Note that it is also applicable that the rear end portion 36a of the front door beam 36 is arranged in correspondence with the upper weak portion 18, and the front end portion 37a of the rear door beam 37 is arranged in correspondence with the lower weak portion 17. In addition, the rear end portion 36a of the front door beam 36 or the front end portion 37a of the rear door beam 37 may be arranged in correspondence with at least one of the weak portion 17 and the weak portion 18. In addition, the rear end portion 36a of the front door beam 36 or the front end portion 37a of the rear door beam 37, which is arranged in correspondence with the lower weak portion 17, may be located at a height equivalent to that of the lower weak portion 17 or may be located in an assumed load input region that is set slightly above the lower weak portion 17.

Next, the advantages resulting from deformation of the portion between the weak portion 17 and the weak portion 18 to be substantially parallel to the vertical direction when the vehicle is hit on the side will be described.

As the portion between the weak portion 17 and the weak portion 18 deforms to be substantially parallel to the vertical direction when the vehicle is hit on the side, for example, it is possible to prevent a situation that the center pillar bends only at the portion corresponding to the lower weak portion 17 and then that portion protrudes into a cabin of the vehicle. In addition, for example, in comparison with the case where the center pillar bends only at the portion corresponding to the lower weak portion 17, when the center pillar 10 bends both at the weak portion 17 and at the weak portion 18 and then the portion between the weak portion 17 and the weak portion 18 deforms to be substantially parallel to the vertical direction, it is possible to suppress a speed at which the deformed portion of the center pillar 10 is displaced.

Figure 14:
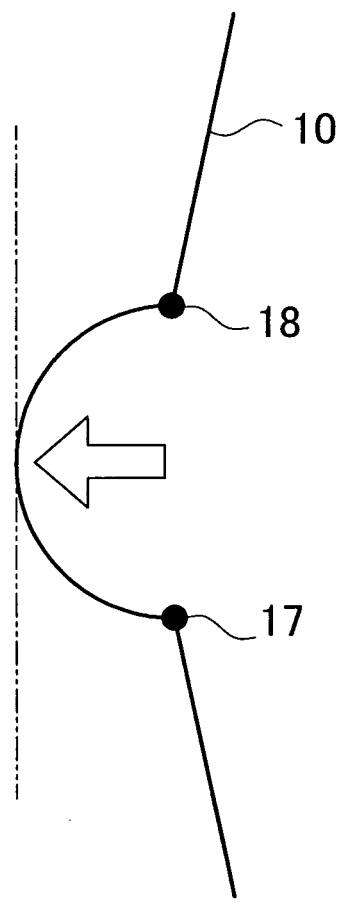
FIG. 14 is a view that shows a state of deformation of a center pillar that is designed so that a portion between weak portions deforms in a curved shape having a tangent line substantially parallel to a vertical direction.

Note that the center pillar 10 may be configured so that, when external force acts on the portion between the weak portion 17 and the weak portion 18 from the outside in the vehicle width direction, a displacement of the portion between the weak portion 17 and the weak portion 18 is maximal. In addition, as shown in FIG. 14, the center pillar 10 may be configured so that the portion between the weak portion 17 and the weak portion 18 deforms into a curved shape having a tangent line that is substantially parallel to the vertical direction.

Next, a shock-absorbing member 38 arranged in correspondence with the portion between the weak portion 17 and the weak portion 18 will be described.

Figure 15:
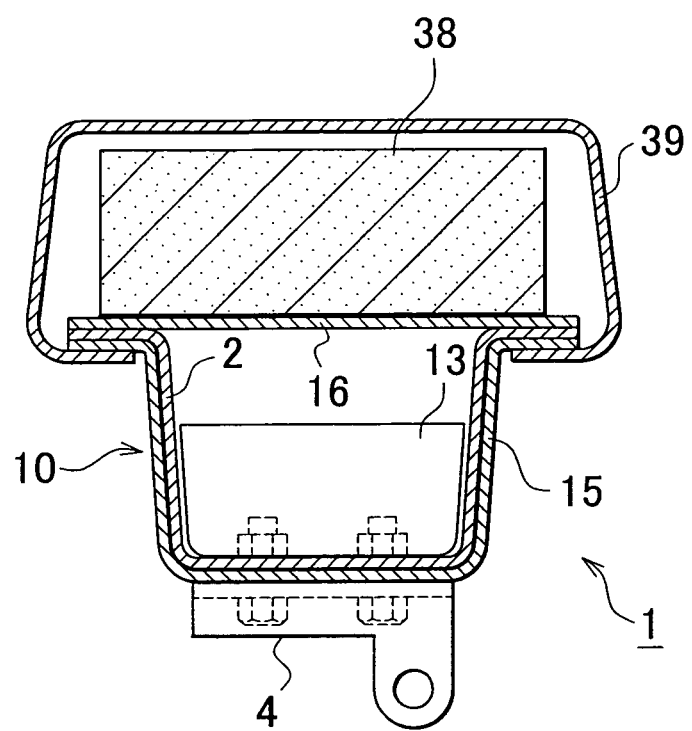
FIG. 15 is a cross-sectional view of a center pillar structure that has a shock-absorbing member.

FIG. 15 is a cross-sectional view of a center pillar structure that has the shock-absorbing member 38. As shown in FIG. 15, a pillar garnish 39 is attached onto the inner side (cabin side) of the center pillar 10. The shock-absorbing member 38 is, for example, made of urethane foam. The shock-absorbing member 38 is arranged in the pillar garnish 39 so as to face the portion between the weak portion 17 and the weak portion 18 in the vehicle width direction. Thus, even when the portion between the weak portion 17 and the weak portion 18 deforms into the cabin at the time when the vehicle is hit on the side, the shock may be reduced.

Note that the shock-absorbing member 38 may be attached to a seat side surface, or the like, as long as the shock-absorbing member 38 is arranged on the inner side with respect to the center pillar 10 in correspondence with the portion between the weak portion 17 and the weak portion 18.

Figure 16:
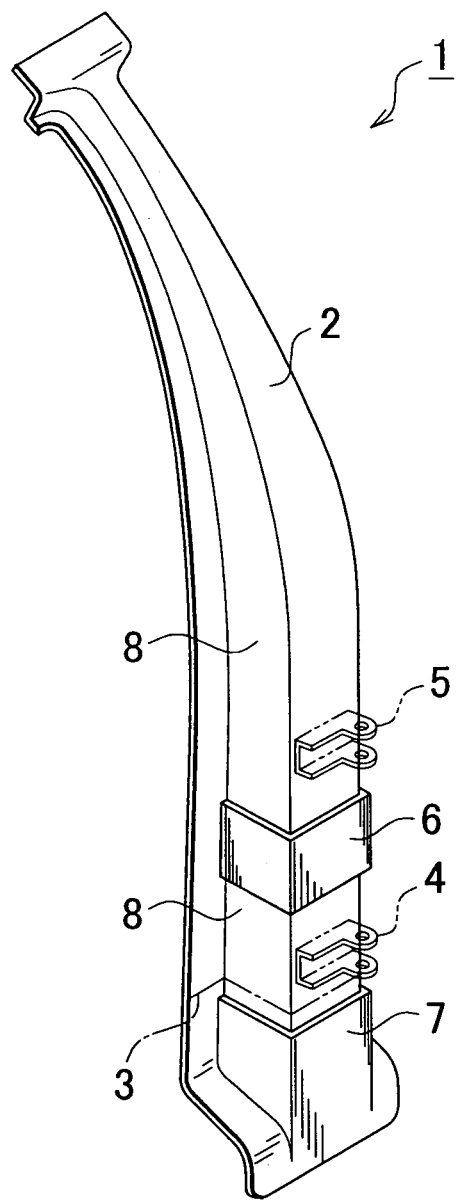
FIG. 16 is a perspective view of a center pillar structure, which is a second embodiment of the pillar structure of a vehicle according to the invention.
Figure 17:
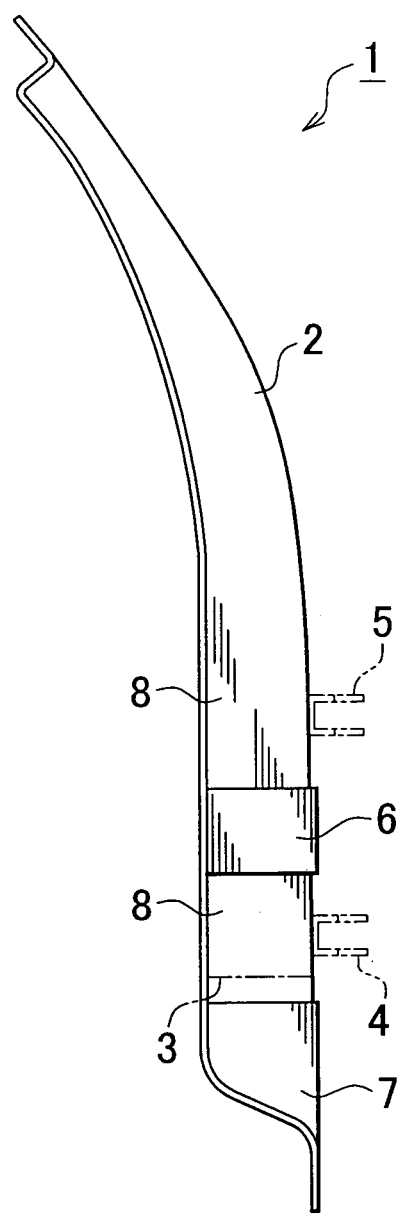
FIG. 17 is a front view of the center pillar structure shown in FIG. 16.

FIG. 16 is a perspective view of a center pillar structure, which is a second embodiment of the pillar structure of a vehicle according to the invention. FIG. 17 is a front view of the center pillar structure shown in FIG. 16. As shown in FIG. 16 and FIG. 17, the center pillar structure 1 includes an outer reinforcement 2. The outer reinforcement 2 is formed so that high-tensile steel plates are jointed via a laser welding seam 3. The upper end portion of the outer reinforcement 2 is connected to a roof side rail, and the lower end portion of the outer reinforcement 2 is connected to a rocker.

An outward projected non-quenched portion 6 is formed in the outer reinforcement 2 between a portion to which a lower hinge 4 of a door is attached and a portion to which an upper hinge 5 of the door is attached. In addition, an outward projected non-quenched portion 7 is formed in the outer reinforcement 2 between the portion to which the lower hinge 4 is attached and a portion connected to the rocker. In this way, the non-quenched portions 6 and 7 are formed in the outer reinforcement 2 at the upper and lower portions with respect to the portion to which the lower hinge 4 is attached, while quenched portions 8 are formed in the outer reinforcement 2 at portions other than the non-quenched portions 6 and 7. Thus, in the center pillar 10, portions corresponding to the weak portion 17 and the weak portion 18 according to the first embodiment are implemented respectively by the non-quenched portion 7 and the non-quenched portion 6.

As described above, with the center pillar structure 1, by forming the non-quenched portions 6 and 7 in the outer reinforcement 2 at the upper and lower portions with respect to the portion to which the lower hinge 4 is attached, it is possible to easily form buckling points (bending points) in the event of a side collision. Then, when the vehicle is hit on the side, the outer reinforcement 2 bends at the upper and lower portions with respect to the portion to which the lower hinge 4 is attached, so it is possible to reduce the bending moment generated in the outer reinforcement 2 due to advancement of the other vehicle. Thus, with the center pillar structure 1, it is possible to control deformation of the center pillar in the event of a side collision while ensuring the strength of the center pillar.

Figure 18A:
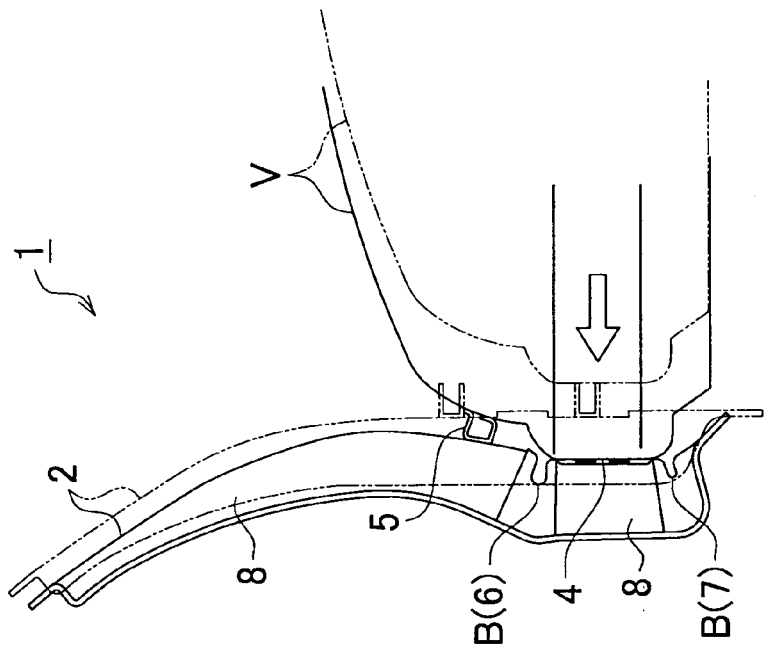
FIG. 18A is a view that shows a state of deformation of an outer reinforcement in the event of a side collision according to a related art.
Figure 18B:
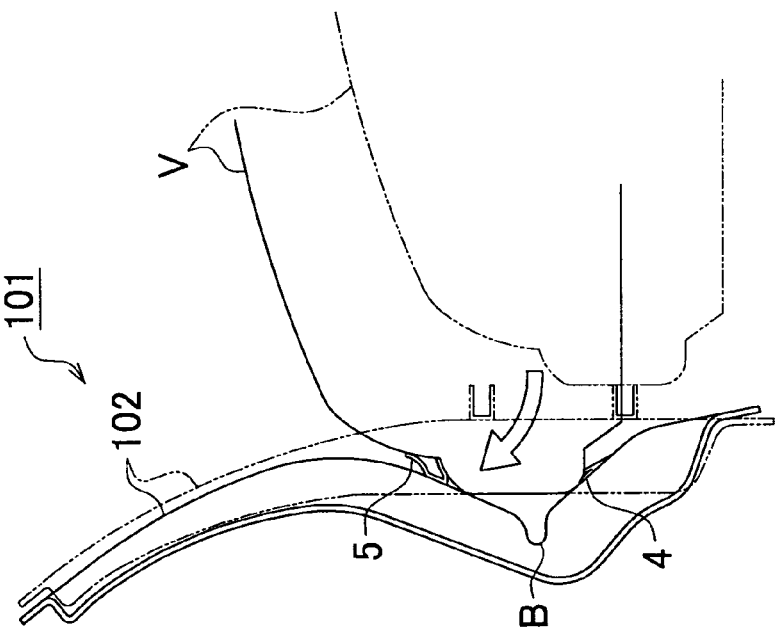
FIG. 18B is a view that shows a state of deformation of an outer reinforcement in the event of a side collision according to the second embodiment.

FIG. 18A shows an outer reinforcement 102 in which one point, that is, an upper portion with respect to the portion to which the lower hinge 4 is attached, becomes a buckling point B when the vehicle is hit on the side. FIG. 18B shows the outer reinforcement 2 according to the second embodiment in which two points, that is, the upper and lower portions with respect to the portion to which the lower hinge 4 is attached, become buckling points B when the vehicle is hit on the side. Note that, in the outer reinforcement 2 shown in FIG. 18B, the strength of the non-quenched portion 7 is lower than the strength of the non-quenched portion 6.

As shown in FIG. 18A, in the outer reinforcement 102, a lower portion with respect to the one buckling point B deforms to incline and then the other vehicle V advances along the inclined lower portion. This increases the bending moment generated in the outer reinforcement 102. On the other hand, as shown in FIG. 18B, in the outer reinforcement 2, the portion between the two buckling points B does not significantly incline when the outer reinforcement 2 deforms. This reduces the bending moment generated in the outer reinforcement 2 due to advancement of the other vehicle V.

Figure 19A:
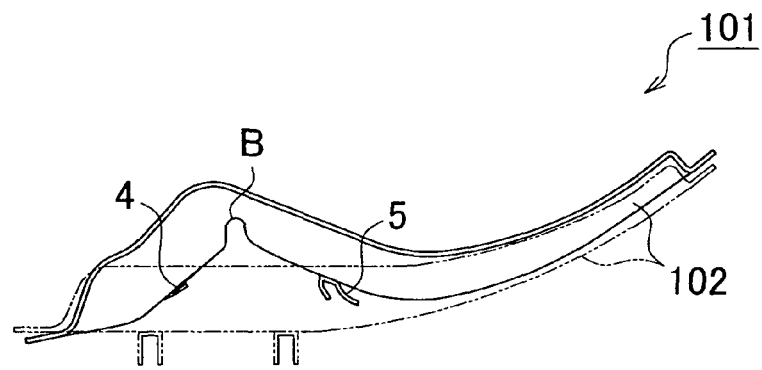
FIG. 19A, FIG. 19B and FIG. 19C respectively show the deformed outer reinforcement shown in FIG. 18A, a bending moment diagram and shearing force diagram of the deformed outer reinforcement shown in FIG. 18A.
Figure 19B:
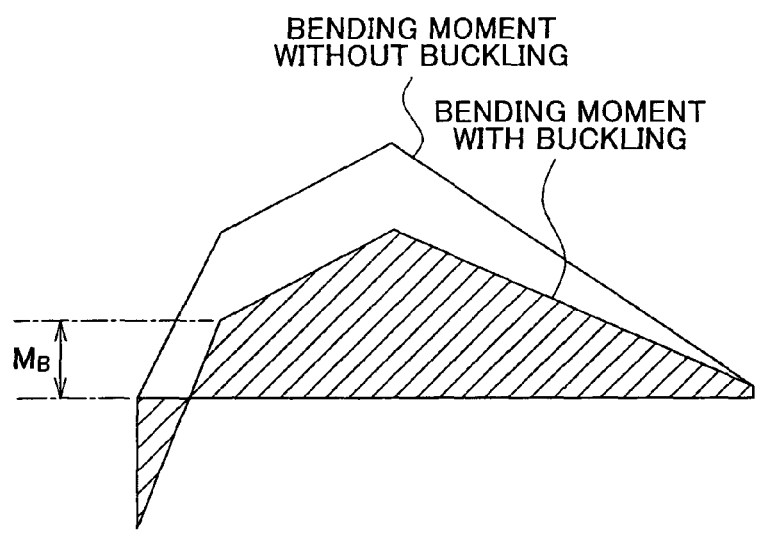
Figure 19C:
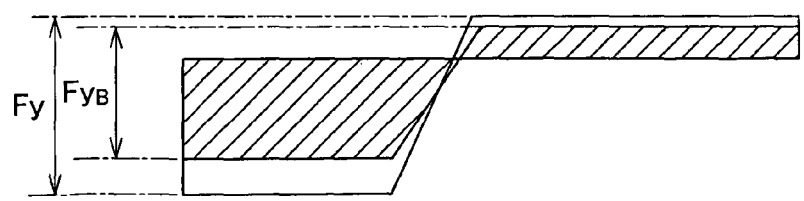
Figure 20A:
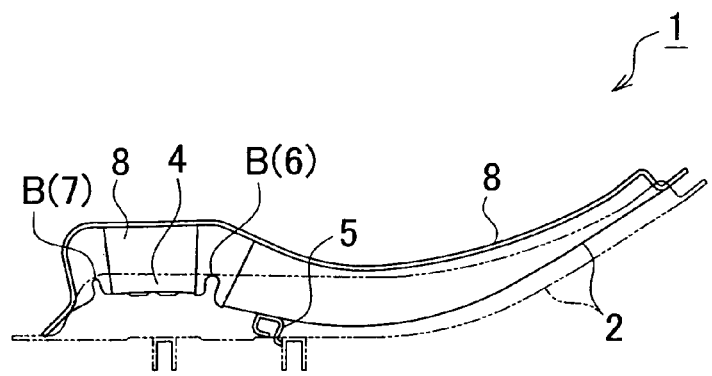
FIG. 20A, FIG. 20B and FIG. 20C respectively show the deformed outer reinforcement shown in FIG. 18B, a bending moment diagram and shearing force diagram of the deformed outer reinforcement shown in FIG. 18B.
Figure 20B:
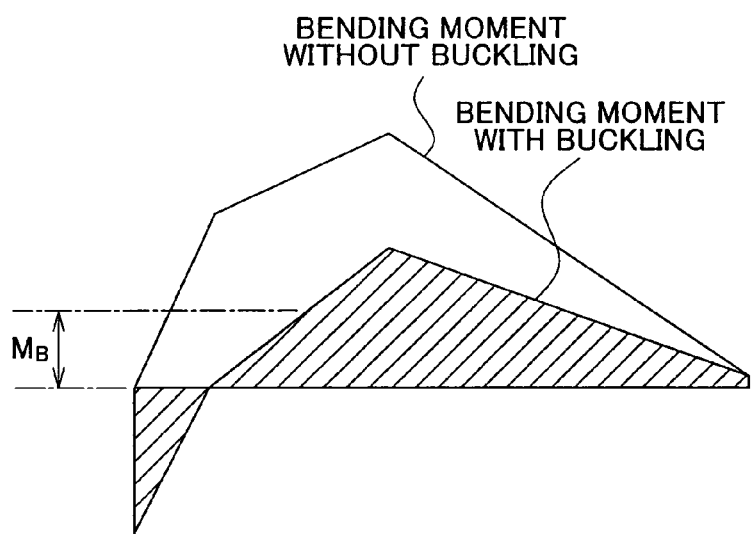
Figure 20C:
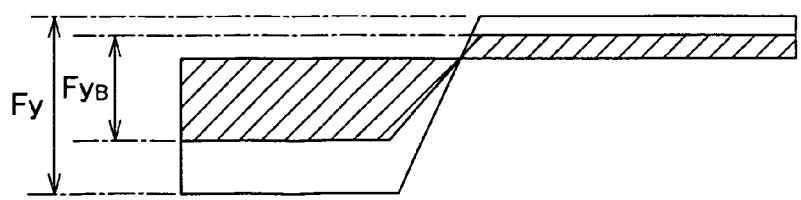

FIG. 19A to FIG. 19C respectively show the deformed outer reinforcement 102 shown in FIG. 18A, a bending moment diagram and shear force diagram of the deformed outer reinforcement 102 shown in FIG. 18A. FIG. 20A, FIG. 20B and FIG. 20C respectively show the deformed outer reinforcement 2 shown in FIG. 18B, a bending moment diagram and shear force diagram of the deformed outer reinforcement 2 shown in FIG. 18B. Note that, in FIG. 19A to FIG. 19C and FIG. 20A to FIG. 20C, $M_B$ indicates a moment applied to the buckling point B. In addition, Fy indicates an impact reaction force generated by the outer reinforcement, and $Fy_B$ is a reaction force generated by bending within Fy.

As shown in FIG. 19A to FIG. 19C and FIG. 20A to FIG. 20C, in comparison with the outer reinforcement 102, in the outer reinforcement 2, the amount of deformation in the lateral direction of the center pillar reduces, and the applied moment $M_B$ reduces owing to the plastic hinge action due to the non-quenched portion 6 located near the middle of the outer reinforcement 2. Then, in the outer reinforcement 2, within the impact reaction force Fy, an increase in axial force compensates for a decrease in reaction force $Fy_B$ generated by bending in the event of a side collision. That is, the outer reinforcement 102 generates an impact reaction force in the event of a side collision by a relatively large bending and a relatively small axial force, whereas the outer reinforcement 2 generates an impact reaction force in the event of a side collision by a relatively small bending and a relatively large axial force.

Thus, in the center pillar structure 1 that includes the outer reinforcement 2 according to the second embodiment shown in FIG. 18B, a moment input to a beltline portion reduces. Therefore, it is possible to reduce reinforcement at the beltline portion, and it is possible to reduce the weight and cost of the center pillar.

Next, a method for manufacturing the above described center pillar structure 1, which is a method for manufacturing a pillar structure of a vehicle according to the second embodiment, will be described.

Figure 21:
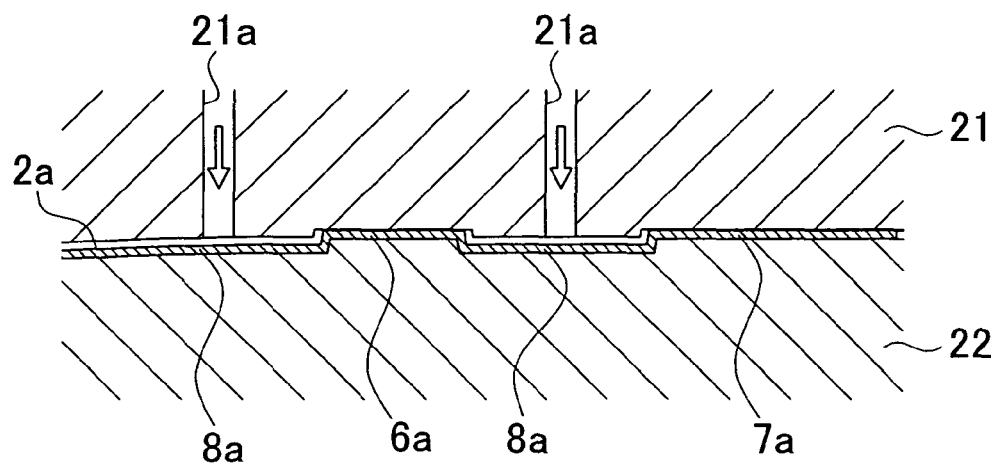
FIG. 21 is a view that shows a process of manufacturing the center pillar structure shown in FIG. 16.

First, as shown in FIG. 21, a high-tensile steel plate 2a, which will be the outer reinforcement 2, is prepared, and then the high-tensile steel plate 2a is stamped and heated with a cope (die) 21 and a drag (die) 22 for hot stamping. At this time, gaps between the cope 21 and drag 22 and the high-tensile steel plate 2a are appropriately controlled so that gaps between the cope 21 and portions 6a and 7a corresponding to the non-quenched portions 6 and 7 in the high-tensile steel plate 2a are narrower than gaps between the cope 21 and portions 8a corresponding to the quenched portions 8 in the high-tensile steel plate 2a. Here, the cope 21 is brought into close contact with the portions 6a and 7a corresponding to the non-quenched portions 6 and 7.

Figure 22:
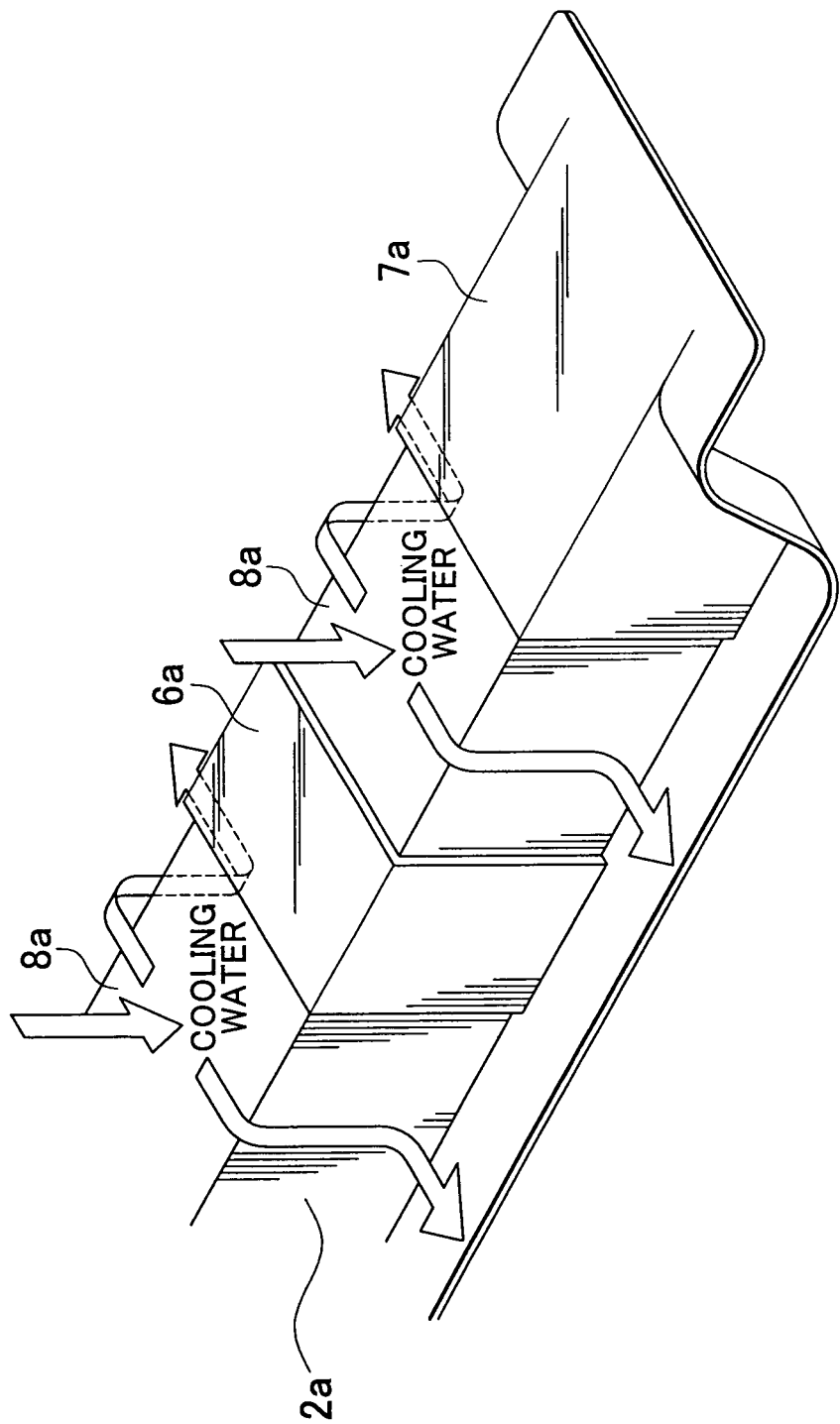
FIG. 22 is a view that shows the process of manufacturing the center pillar structure shown in FIG. 16.

Subsequently, cooling water is supplied through cooling water supply holes 21a, formed in the cope 21, into the gaps between the cope 21 and the portions 8a corresponding to the quenched portions 8. At this time, the cope 21 is in close contact with the portions 6a and 7a corresponding to the non-quenched portions 6 and 7. Therefore, as shown in FIG. 22, cooling water does not flow to the portions 6a and 7a corresponding to the non-quenched portions 6 and 7, and cooling water flows only to the portions 8a corresponding to the quenched portions 8. Thus, only the portions 8a are quenched by rapid cooling. Then, the thus formed outer reinforcement 2 is used to manufacture the center pillar structure 1.

As described above, in the method for manufacturing the center pillar structure 1, flow of cooling water to the portions 6a and 7a of the heated high-tensile steel plate 2a, corresponding to the non-quenched portions 6 and 7, is suppressed. Thus, the quenching densities of the portions 6a and 7a corresponding to the non-quenched portions 6 and 7 are lower than the quenching densities of the portions 8a corresponding to the quenched portions 8. Therefore, the upper and lower portions with respect to the portion to which the lower hinge 4 is attached in the outer reinforcement 2 may be easily and reliably formed as the non-quenched portions 6 and 7.

Figure 23:
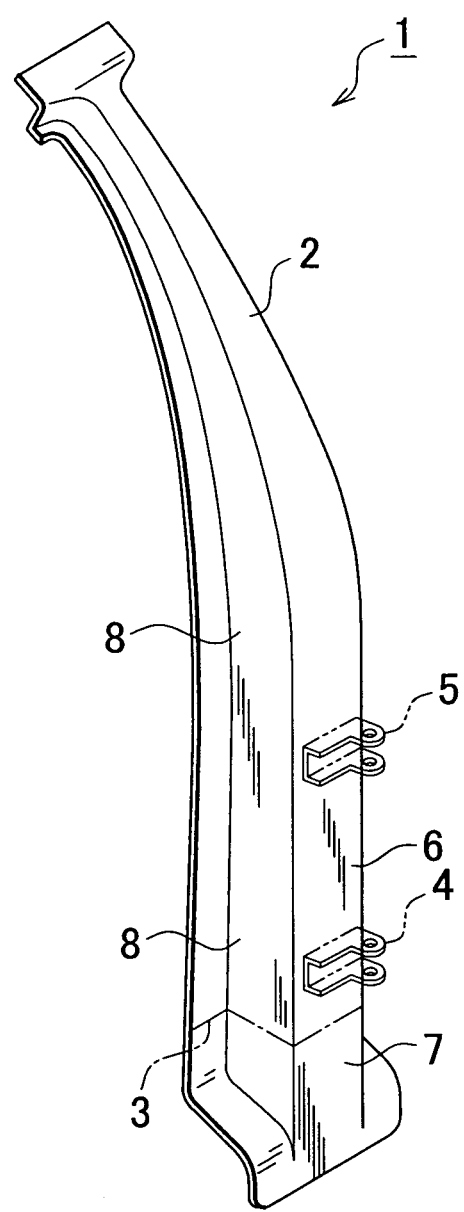
FIG. 23 is a perspective view of a center pillar structure, which is a third embodiment of the pillar structure of a vehicle according to the invention.

FIG. 23 is a perspective view of a center pillar structure, which is a third embodiment of the pillar structure of a vehicle according to the invention. As shown in FIG. 23, the center pillar structure 1 according to the third embodiment differs from the above described center pillar structure 1 according to the second embodiment in that non-quenched portions 6 and 7 are not projected in the outer reinforcement 2.

Figure 24:
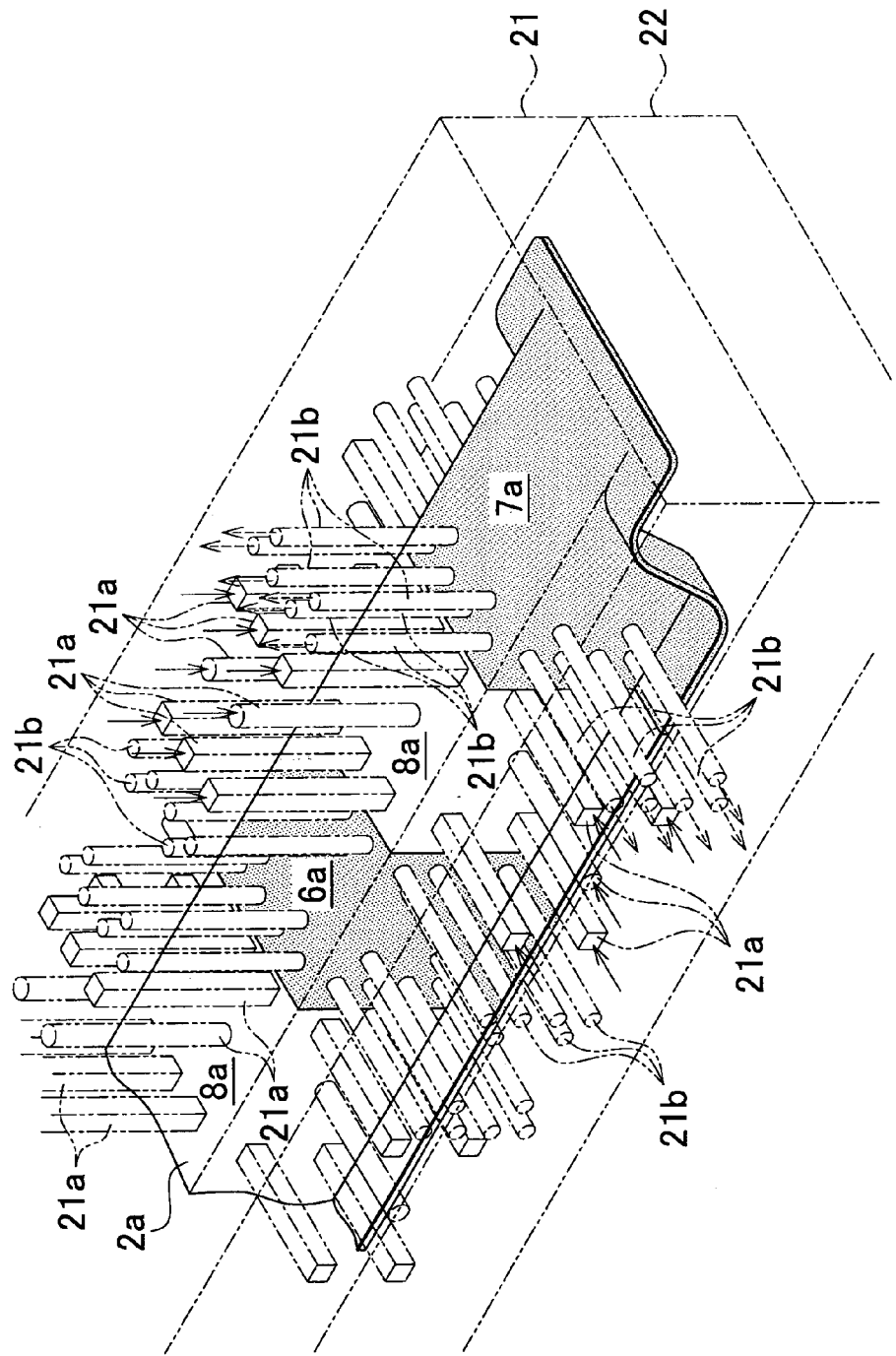
FIG. 24 is a view that shows a process of manufacturing the center pillar structure shown in FIG. 23.
Figure 25:
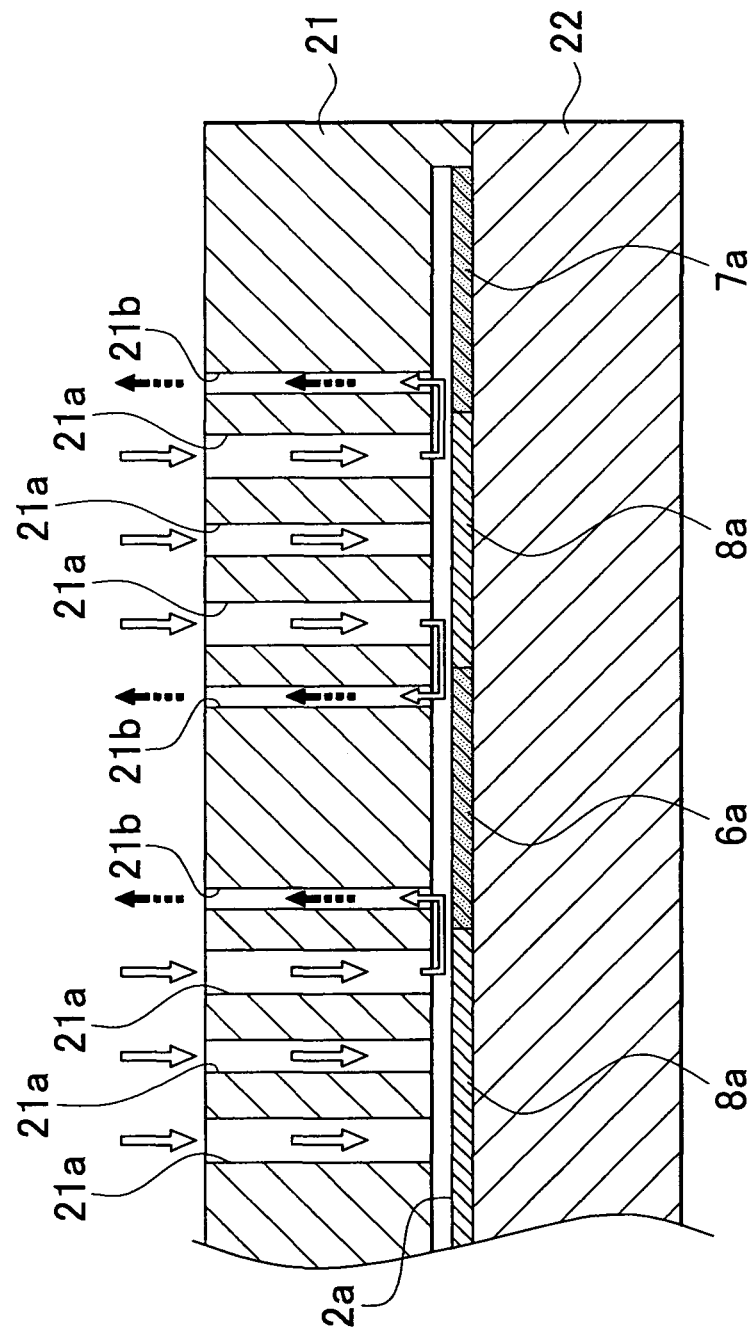
FIG. 25 is a view that shows a process of manufacturing the center pillar structure shown in FIG. 23.

The center pillar structure 1 is manufactured as follows. That is, as shown in FIG. 24 and FIG. 25, a high-tensile steel plate 2a, which will be the outer reinforcement 2, is prepared, and then the high-tensile steel plate 2a is stamped and heated with a cope (die) 21 and a drag (die) 22 for hot stamping.

Subsequently, cooling water is supplied through cooling water supply holes 21a into gaps between the cope 21 and the portions 8a corresponding to the quenched portions 8. The cooling water supply holes 21a are formed in the cope 21 at portions in correspondence with the quenched portions 8. The supplied cooling water is drained outside through cooling water drain holes 21b. The cooling water drain holes 21b are formed in the cope 21 at portions in correspondence with boundaries between the quenched portions 8 and the non-quenched portions 6 and 7. Thus, no cooling water flows to the portions 6a and 7a corresponding to the non-quenched portions 6 and 7, and cooling water flows only to the portions 8a corresponding to the quenched portions 8. Hence, only the portions 8a are quenched by rapid cooling. Then, the thus formed outer reinforcement 2 is used to manufacture the center pillar structure 1.

As described above, in the method for manufacturing the center pillar structure 1, flow of cooling water to the portions 6a and 7a of the heated high-tensile steel plate 2a, corresponding to the non-quenched portions 6 and 7, is suppressed. Thus, the quenching densities of the portions 6a and 7a corresponding to the non-quenched portions 6 and 7 are lower than the quenching densities of the portions 8a corresponding to the quenched portions 8. Therefore, the upper and lower portions with respect to the portion to which the lower hinge 4 is attached in the outer reinforcement 2 may be easily and reliably formed as the non-quenched portions 6 and 7.

The aspect of the invention is not limited to the above described embodiments.

Figure 26:
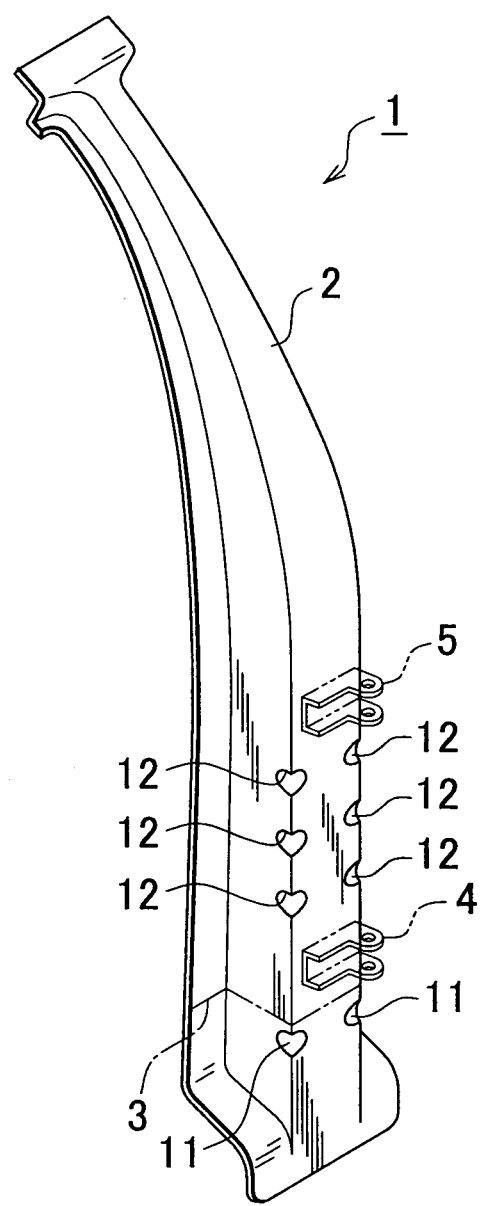
FIG. 26 is a perspective view of a center pillar structure, which is another embodiment of the pillar structure of a vehicle according to the invention.
Figure 27:
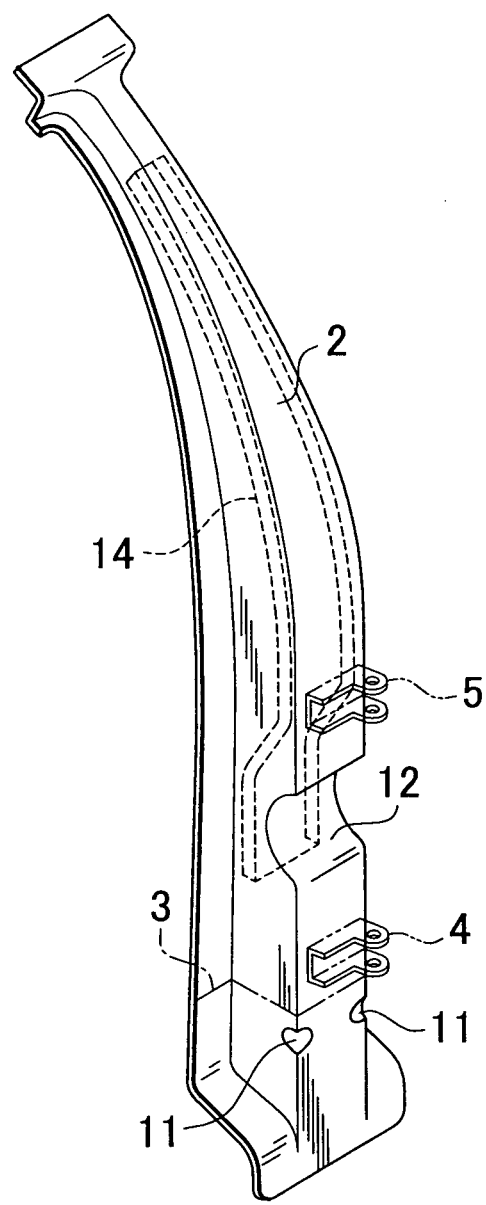
FIG. 27 is a perspective view of a center pillar structure, which is another embodiment of the pillar structure of a vehicle according to the invention.

For example, as shown in FIG. 26 and FIG. 27, when the outer reinforcement 2 has cutout beads 11 and 12 instead of the non-quenched portions 6 and 7 in the third embodiment as well, it is possible to reduce the bending moment generated in the outer reinforcement 2 by lifting of the other vehicle in the event of a side collision.

In the outer reinforcement 2 shown in FIG. 26, a pair of outer edge line portions respectively have the beads 11 and 12. In the outer reinforcement 2, the number of beads 12 formed in the upper portion with respect to the portion to which the lower hinge 4 is attached is larger than the number of beads 11 formed in the lower portion with respect to the portion to which the lower hinge 4 is attached, while, on the other hand, the thickness and material are varied between the lower portion and the upper portion. Thus, the strength of the member of the upper portion with respect to the laser welding seam 3 is higher than the strength of the member of the lower portion with respect to the laser welding seam 3. In this case, it is not necessary to joint high-tensile steel plates at the laser welding seam 3 as a boundary in order to form the outer reinforcement 2.

Figure 28:
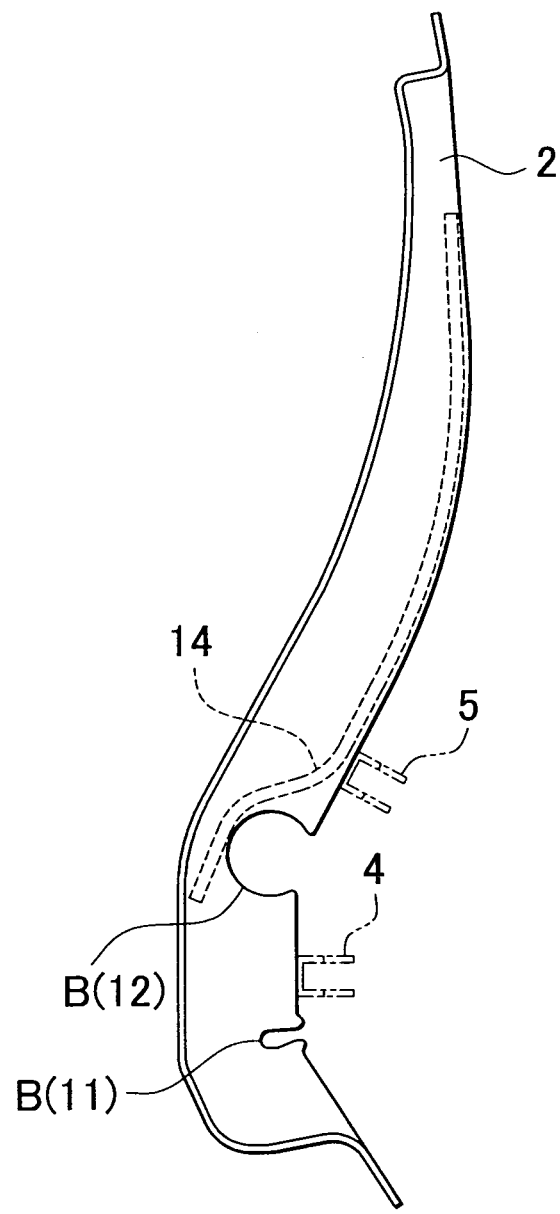
FIG. 28 is a view that shows a state of deformation of an outer reinforcement shown in FIG. 27 in the event of a side collision.

In addition, in the outer reinforcement 2 shown in FIG. 27, a bead 12 is formed to extend over a pair of outer edge line portions, and beads 11 are formed respectively at the pair of outer edge line portions. Then, a lower end portion of the hinge reinforcement 14 that extends along the inner surface of the outer wall of the outer reinforcement 2 is elongated to the inner side of the bead 12. With the thus configured outer reinforcement 2 and hinge reinforcement 14, as shown in FIG. 28, when the vehicle is hit on the side, the outer reinforcement 2 reliably bends at the upper portion with respect to the portion to which the lower hinge 4 is attached while preventing excessive deformation of the center pillar by interference of the outer reinforcement 2 with the hinge reinforcement 14. Thus, it is possible to obtain a stable deformation mode. In this case, it is not necessary to joint high-tensile steel plates at the laser welding seam 3 as a boundary in order to form the outer reinforcement 2.

In addition, the pillar structure of a vehicle according to the aspect of the invention is not necessarily limited to a center pillar structure, and the number of weak portions of the pillar is not limited to two. Furthermore, the weak portion may be implemented not only by the shape of a member that constitutes the pillar but also by changing the material of a member that constitutes the pillar, adjusting the thickness of the material of the member, a degree to which the material of the member is quenched, the plastic effect of the material of the member, or the like.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A pillar structure of a vehicle, comprising:
a pillar that includes a first weak portion and a second weak portion, wherein the second weak portion is located above the first weak portion,
wherein:
the strength of the first weak portion is lower than the strength of the second weak portion;
the pillar includes an outer shell and a reinforcement member arranged in the outer shell;
the reinforcement member connected to a rocker of the vehicle;
the first weak portion and the second weak portion are respectively implemented by weakened portions in the reinforcement member;
at least one of the first weak portion and the second weak portion includes a load input member that facilitates a load to be input to the at least one of the first weak portion and the second weak portion when an external force acts on the vehicle from an outer side in a vehicle width direction; and
a strength of the load input member is higher than a strength of the reinforcement member and is lower than a bonding strength between the rocker and the reinforcement member.

2. The pillar structure of a vehicle according to claim 1, wherein the pillar has a protrusion, that protrudes outward from the pillar in a vehicle width direction, between the first weak portion and the second weak portion.

3. The pillar structure of a vehicle according to claim 1, wherein:
the first weak portion is located below an acting portion at which the external force is assumed to act on the pillar from an outer side in a vehicle width direction; and
the second weak portion is located above the acting portion.

4. The pillar structure of a vehicle according to claim 1, wherein the weakened portions in the reinforcement member are implemented by beads formed in the reinforcement member.

5. The pillar structure of a vehicle according to claim 4, wherein a difference in strength between the first weak portion and the second weak portion is implemented by at least any one of the size of the beads, the number of the beads, and the thickness of the reinforcement member in which the beads are formed.

6. The pillar structure of a vehicle according to claim 1, wherein each of the weakened portions in the reinforcement member is implemented by at least one of a bead or a harness fitting hole, which is formed in the reinforcement member.

7. The pillar structure of a vehicle according to claim 1, wherein:
the reinforcement member has portions to which a first hinge and a second hinge of a door are attached;
the first hinge is attached between the first weak portion and the second weak portion; and
the second hinge is attached above the second weak portion.

8. The pillar structure of a vehicle according to claim 7, wherein the ratio of a distance between the second weak portion and the first hinge to a distance between the first weak portion and the first hinge ranges from 1:1 to 2:1.

9. The pillar structure of a vehicle according to claim 7, wherein at least one of the first hinge and the second hinge projects in a vehicle width direction of the vehicle.

10. The pillar structure of a vehicle according to claim 1, wherein an end portion of a door beam is arranged in correspondence with at least one of the first weak portion and the second weak portion.

11. The pillar structure of a vehicle according to claim 1, wherein a shock-absorbing member is attached between the first weak portion and the second weak portion.

12. The pillar structure of a vehicle according to claim 1, wherein when the external force acts on a portion between the first weak portion and the second weak portion from an outer side in a vehicle width direction, a displacement of the portion between the first weak portion and the second weak portion is maximal.

13. The pillar structure of a vehicle according to claim 1, wherein:
the reinforcement member has non-quenched portions formed at an upper portion and a lower portion with respect to a portion to which a lower hinge of a door is attached, and quenched portions formed at portions other than the upper portion and the lower portion, wherein the first weak portion and the second weak portion are implemented by the non-quenched portions.

14. The pillar structure of a vehicle according to claim 1, wherein:
the first weak portion and the second weak portion are implemented by non-quenched portions.

15. The pillar structure of a vehicle according to claim 13, wherein the non-quenched portions are formed in the reinforcement member to project toward the outer shell.

16. The pillar structure of a vehicle according to claim 13, wherein
when the reinforcement member is quenched, flow of cooling water to portions of the reinforcement member, corresponding to the quenched portions, is increased as compared with flow of cooling water to portions of the reinforcement member, corresponding to the non-quenched portions, and
a quenching density and a strength of the quenched portions are higher than a quenching density and a strength of the non-quenched portions.

17. The pillar structure of a vehicle according to claim 16, wherein the portions corresponding to the non-quenched portions are formed to project, gaps between a hot stamping die and the portions corresponding to the non-quenched portions are narrower than gaps between the hot stamping die and the portions corresponding to the quenched portions and then flow of the cooling water to the portions corresponding to the quenched portions is increased as compared with flow of the cooling water to the portions corresponding to the non-quenched portions.

18. The pillar structure of a vehicle according to claim 1, wherein the ground height of the first weak portion and the ground height of the second weak portion are determined on the basis of a height at which external force is assumed to act on the vehicle from an outer side in a vehicle width direction.

19. The pillar structure of a vehicle according to claim 18, wherein the ground height of the first weak portion and the ground height of the second weak portion are determined on the basis of a bumper height of a vehicle.

20. The pillar structure of a vehicle according to claim 14, wherein the non-quenched portions are formed in the reinforcement member to project toward the outer shell.

21. The pillar structure of a vehicle according to claim 14, wherein
when the reinforcement member is quenched, flow of cooling water to portions of the reinforcement member, corresponding to the quenched portions, is increased as compared with flow of cooling water to portions of the reinforcement member, corresponding to the non-quenched portions, and
a quenching density and a strength of the quenched portions are higher than a quenching density and a strength of the non-quenched portions.

22. The pillar structure of a vehicle according to claim 21, wherein the portions corresponding to the non-quenched portions are formed to project, gaps between a hot stamping die and the portions corresponding to the non-quenched portions are narrower than gaps between the die and the portions corresponding to the quenched portions and then flow of the cooling water to the portions corresponding to the quenched portions is increased as compared with flow of the cooling water to the portions corresponding to the non-quenched portions.

23. A method for manufacturing a pillar structure that includes a load input member, and a pillar having an outer shell and a reinforcement member arranged in the outer shell, comprising:
when the reinforcement member is quenched, increasing flow of cooling water to portions of the reinforcement member, other than an upper portion and a lower portion with respect to a portion, to which a lower hinge of a door is attached, in the reinforcement member, as compared with the upper portion and the lower portion;
providing the pillar with a first weak portion and a second weak portion, which is located above the first weak portion, in such a manner that the upper portion and the lower portion are formed as non-quenched portions and the portions other than the upper portion and the lower portion are formed as quenched portions;
setting the strength of the first weak portion lower than the strength of the second weak portion; and
providing the load input member to one of the first weak portion and the second weak portion, the load input member facilitating a load to be input to the at least one of the first weak portion and the second weak portion when an external force acts on the vehicle from an outer side in a vehicle width direction,
wherein the reinforcement member is connected to a rocker of a vehicle,
wherein a strength of the load input member is higher than a strength of the reinforcement member and is lower than a bonding strength between a rocker and the reinforcement member, and wherein the first weak portion and the second weak portion are respectively implemented by weakened portions in the reinforcement member.

24. The method according to claim 23, wherein when the reinforcement member is quenched, the flow of the cooling water to the portions corresponding to the quenched portions is increased through cooling water supply holes formed in a hot stamping die in correspondence with boundaries between the quenched portions and the non-quenched portion as compared with flow of the cooling water to the portions corresponding to the non-quenched portions, and the flow of the cooling water to the portions corresponding to the quenched portion is drained through cooling water drain holes formed in the hot stamping die in correspondence with boundaries between the quenched portions and the non-quenched portions.

* * * * *